United States Patent
Watanabe et al.

(10) Patent No.: US 6,740,005 B2
(45) Date of Patent: May 25, 2004

(54) SHIFT CONTROL APPARATUS OF AUTOMATIC TRANSMISSION OF MOTOR VEHICLE

(75) Inventors: Kazuyuki Watanabe, Anjou (JP); Toshimitsu Sato, Toyota (JP); Atsushi Ayabe, Toyota (JP); Shinji Kato, Auderghem (BE); Naoyuki Sakamoto, Toyota (JP); Hiromichi Kimura, Okazaki (JP); Noboru Shibata, Anjo (JP); Mitsuhiro Nakamura, Anjo (JP); Hideaki Ogasawara, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/200,172

(22) Filed: Jul. 23, 2002

(65) Prior Publication Data

US 2003/0027685 A1 Feb. 6, 2003

(30) Foreign Application Priority Data

Aug. 1, 2001 (JP) .................................... 2001-233923
Aug. 1, 2001 (JP) .................................... 2001-234154

(51) Int. Cl.[7] .............................................. B60K 41/04
(52) U.S. Cl. ........................ 477/110; 477/54; 477/107
(58) Field of Search ............................ 477/54, 107, 110

(56) References Cited

U.S. PATENT DOCUMENTS 4,473,882 A * 9/1984 Suzuki et al. ........... 477/110 X
5,651,752 A * 7/1997 Wakahara et al. ...... 477/110 X
5,863,275 A * 1/1999 Nozaki et al. ............. 477/110
6,432,025 B1 * 8/2002 Kondo et al. .............. 477/110

FOREIGN PATENT DOCUMENTS

| EP | 0 482 689 | 4/1992 | |
| JP | 4060001163 | * 1/1994 | ............ 477/107 |
| JP | 11-257482 | 9/1999 | |
| JP | 11-287317 | 10/1999 | |

* cited by examiner

Primary Examiner—Ha Ho
(74) Attorney, Agent, or Firm—Oblon, Spivak, McClelland, Maier & Neustadt, P.C.

(57) ABSTRACT

A shift control apparatus of an automatic transmission of a motor vehicle to which torque is transmitted from an engine via a fluid coupling device is provided. In the automatic transmission including a plurality of hydraulically operated friction elements, a clutch-to-clutch downshift is carried out during coasting of the vehicle by releasing one of the friction elements and engaging another friction element. A controller of the shift control apparatus detects a difference between input and output rotation speeds of the fluid coupling device, and increases an engine speed by a controlled amount based on the difference between the input and output rotation speeds when the clutch-to-clutch downshift is carried out during coasting of the vehicle, so that the vehicle is brought into a minimal driving state in which the engine speed is slightly higher than the output rotation speed of the fluid coupling device.

14 Claims, 18 Drawing Sheets

FIG. 2

| POSITION | | CLUTCH & BRAKE | | | | | | | O.W.C | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKING | ○ | × | × | × | ○ | × | ○ | △ | △ |

FIG. 8
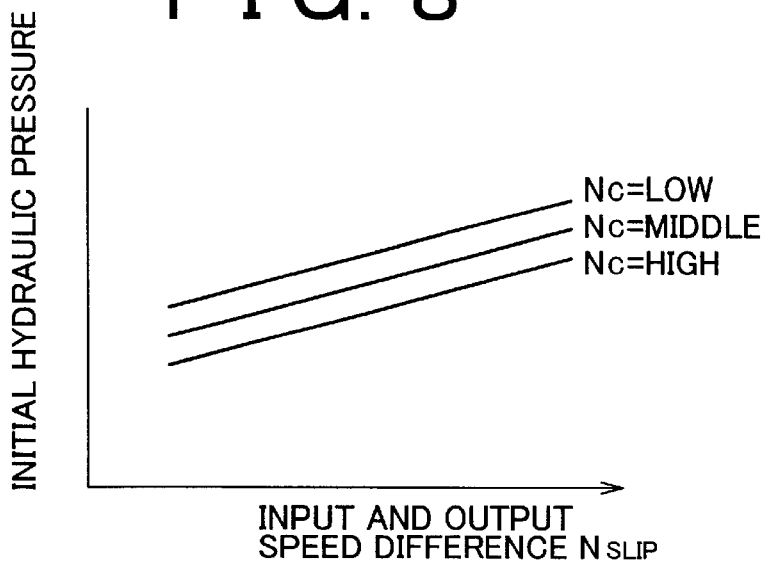
FIG. 9
| $N_{SLIPAV}$ (r.p.m) | 100 | 200 | 300 |
|---|---|---|---|
| REQUIRED ISC VALVE DRIVE AMOUNT (r.p.m) ($N_E$ INCREASE) | 400 | 300 | 200 |
FIG. 10
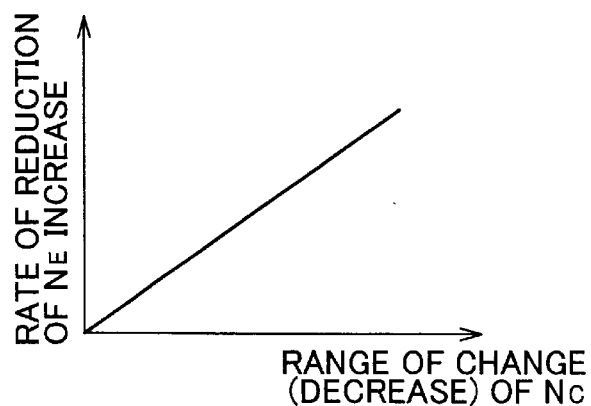

SHIFT CONTROL APPARATUS OF AUTOMATIC TRANSMISSION OF MOTOR VEHICLE

INCORPORATION BY REFERENCE

The disclosures of Japanese Patent Applications No. 2001-234154 filed on Aug. 1, 2001 and No. 2001-233923 filed on Aug. 1, 2001, each including the specification, drawings and abstract, are incorporated herein by reference in its entirety.

BACKGROUND OF THE INVENTION

1. Field of the Invention

The invention generally relates to a shift control apparatus of an automatic transmission of a motor vehicle, and more particularly to such a shift control apparatus that effects coast downshift of the transmission while the vehicle is kept in a minimal driving state in which a weak engine brake is applied.

2. Description of Related Art

One type of a downshift control apparatus of an automatic transmission of a motor vehicle has been proposed which keeps the vehicle in a weak engine brake state when the automatic transmission is shifted down while the vehicle is coasting or decelerating with the accelerator pedal being released or not operated. An example of such a downshift control apparatus is disclosed in Japanese laid-open Patent Publication No. 11-287317. With this apparatus, certain engine brake force is kept constantly applied to the vehicle during clutch-to-clutch downshifts, whereby the downshifts to low-speed gear ratios do not cause excessive engine brakes or shift shocks.

When the automatic transmission goes through a clutch-to-clutch downshift, a release-side friction element (or off-going friction element) is released and an engagement-side friction element (or oncoming friction element) is engaged around at the same time, and therefore the transmission tends to suffer from racing (a rapidly increase in the speed) of its input shaft or a temporary drop (or tie-up) of its output torque. In view of these situations, expensive control equipment that operates with considerably high accuracy may be required to control the engaging pressure for the release-side friction element when it is released and the engaging pressure for the engagement-side friction element when it is engaged. With generally available control apparatus for use in standard vehicles, however, the engaging pressures for the friction elements cannot be controlled with sufficiently high robustness with respect to disturbances, such as braking of the vehicle, and shift shocks may not be sufficiently reduced or suppressed.

SUMMARY OF THE INVENTION

It is therefore one object of the invention to provide a shift control apparatus of an automatic transmission with which a clutch-to-clutch downshift during coasting of the vehicle is controlled with sufficiently high robustness with respect to disturbances, such as braking of the vehicle. It is another object of the invention to provide a shift control apparatus of an automatic transmission with which a clutch-to-clutch downshift during coasting is controlled without using high-accuracy control equipment, so that shift shocks are sufficiently reduced even in the event of disturbances, such as braking of the vehicle.

To accomplish the above and/or other object(s), there is provided according to a first aspect of the invention a shift control apparatus of an automatic transmission of a motor vehicle to which a torque is transmitted from an engine via a fluid coupling device, the automatic transmission including a plurality of hydraulically operated friction elements, wherein a clutch-to-clutch downshift is carried out during coasting of the vehicle by releasing one of the friction elements as a release-side friction element and engaging another of the friction elements as an engagement-side friction element. A controller of the shift control apparatus detects a difference between input and output rotation speeds of the fluid coupling device, and increases an engine speed by a controlled amount based on the difference between the input and output rotation speeds when the clutch-to-clutch downshift is carried out during coasting of the vehicle, so that the vehicle is brought into a minimal driving state in which the engine speed is slightly higher than the output rotation speed of the fluid coupling device.

With the shift control apparatus constructed as described above, the engine speed is increased by a controlled amount based on the difference between the input and output rotation speeds of the fluid coupling device when a clutch-to-clutch downshift is effected during coasting of the vehicle. Since the clutch-to-clutch downshift is carried out during coasting while the vehicle is maintained in the minimal driving state as described above, the hydraulic pressures applied to the friction elements associated with the downshift can be controlled with high accuracy owing to reduced torque variation, and sufficient robustness with respect to disturbances, such as braking of the vehicle, can be achieved without requiring high-accuracy control apparatus.

According to a second aspect of the invention, there is provided a shift control apparatus of an automatic transmission of a motor vehicle in which a coast downshift is carried out during coasting of the vehicle, the automatic transmission including a plurality of hydraulically operated friction elements. A controller of the shift control apparatus causes the coast downshift to be carried out while the vehicle is kept in a minimal driving state in which an engine speed is slightly higher than an input shaft speed of the automatic transmission, and sets a hydraulic pressure applied to at least one of the friction elements associated with the coast downshift during a shifting period, according to the minimal driving state.

With the shift control apparatus as described above, the hydraulic pressures applied to the hydraulically operated friction elements associated with the coast downshift during the shifting period are set in accordance with the minimal driving state. Thus, the engaging pressures for the friction elements can be appropriately controlled during the shifting period, so that the engaging and releasing actions can be accomplished with high accuracy, irrespective of disturbances such as braking, resulting in sufficiently reduced shift shocks.

According to a third aspect of the invention, there is provided a shift control apparatus of an automatic transmission of a motor vehicle in which a coast downshift is carried out during coasting while the vehicle is kept in a minimal driving state in which an engine speed is slightly higher than an input shaft speed of the automatic transmission, the automatic transmission including a plurality of hydraulically operated friction elements. A controller of the shift control apparatus controls a hydraulic pressure applied to at least one of the friction elements associated with the coast downshift during a shifting period, according to the minimal driving state, and corrects, by learning, the hydraulic pressure for the at least one friction element during the shifting period.

With the shift control apparatus constructed as described above, the hydraulic pressures applied to the hydraulically operated friction elements associated with the coast downshift during the shifting period are set in accordance with the minimal driving state. Thus, the engaging pressures for the friction elements can be appropriately controlled during the shifting period, so that the engaging and releasing actions can be accomplished with high accuracy, irrespective of disturbances such as braking, resulting in sufficiently reduced shift shocks. In addition, correcting the hydraulic pressures by learning reduces or eliminates differences among individual apparatus or chronological changes, thus assuring improved accuracy in the engaging/releasing actions and significantly reduced shift shocks.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 2 is a table indicating engaged/released states of clutches and brakes when each gear ratio of the automatic transmission of FIG. 1 is established;

FIG. 8 is a graph showing relationships used for determining the initial pressure in an engagement-side engaging pressure control unit or a release-side engaging pressure control unit as shown in FIG. 7;

FIG. 9 is a table used by a minimal driving state control unit as shown in FIG. 7 for determining an engine speed increase amount (required drive amount of an ISC valve);

FIG. 10 is a relationship used by the minimal driving state control unit of FIG. 7 for determining the rate of decrease of the engine speed based on the rate of decrease of the turbine speed increase amount;

DETAILED DESCRIPTION OF PREFERRED EMBODIMENTS

Figure 1:
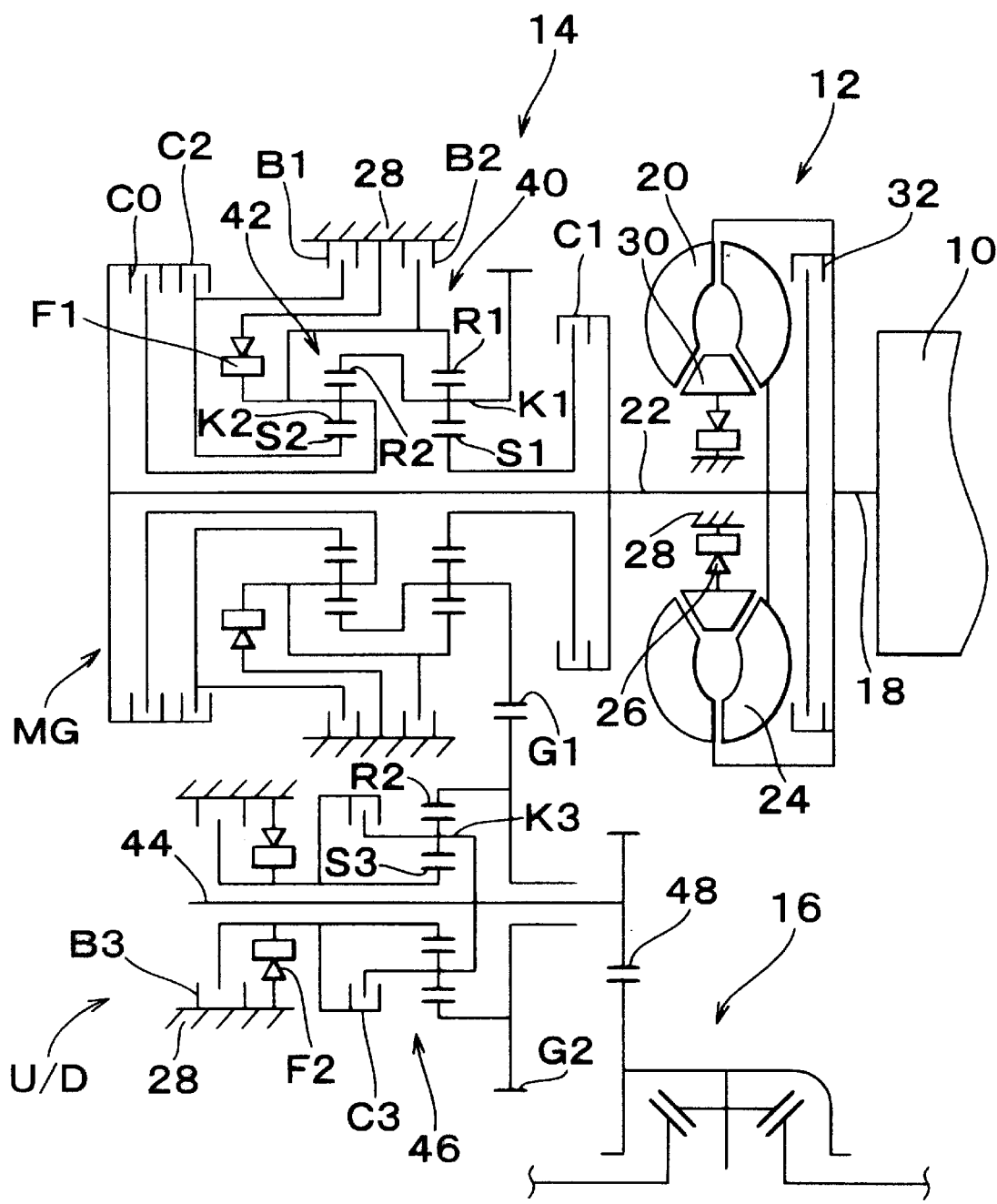
FIG. 1 is a view showing the construction of an automatic transmission of a motor vehicle in which a shift control apparatus according to one exemplary embodiment of the invention is employed.

One exemplary embodiment of the invention will be described in detail with reference to the accompanying drawings. In a motor vehicle as shown in FIG. 1, driving power of an engine 1 is transmitted to driving wheels (i.e., front wheels) (not shown), via a torque converter 12 as a fluid coupling device, an automatic transmission 14 for use in a front-engine front-drive vehicle, and a differential gear device 16. The torque converter 12 includes a pump impeller 20 coupled to a crankshaft 18 of the engine 10, a turbine blade 24 coupled to an input shaft 22 of the automatic transmission 14, a stator 30 fixed to a housing 28 serving as a non-rotating member via a one-way clutch 26, and a lock-up clutch 32 coupled to the input shaft 22 via a damper (not shown).

The automatic transmission 14 includes single-pinion type first planetary gear set 40 and second planetary gear set 42 disposed coaxially with each other on the input shaft 22 of the transmission 14, a third planetary gear set 46 disposed on a counter shaft 44 parallel with the input shaft 22, and an output gear 48 fixed on one end portion of the counter shaft 44. The first and second planetary gear sets 40, 42 provide a so-called CR—CR coupling type planetary gear mechanism in which carriers of the planetary gear sets 40, 42 are respectively coupled to ring gears thereof. The output gear 48 meshes with the differential gear device 16. Each of the planetary gear sets 40, 42, 46 includes a sun gear, a ring gear, and a carrier that rotatably supports a planetary gear that meshes with the sun gear and the ring gear. The sun gears, ring gears and the carriers are selectively connected to each other via four clutches C0, C1, C2, C3, or are selectively connected (or fixed) to the housing 28 as a non-rotating member 9 by three brakes B1, B2, B3. Two one-way clutches F1, F2 are provided for connecting the carrier K2 of the second planetary gear set 42 and the sun gear S3 of the third planetary gear set 46, respectively, to the housing 28 depending upon its rotating direction. It is to be noted that the differential gear device 16 is constructed symmetrically with respect to an axle of the vehicle, and only the upper half of the gear device 16 is illustrated in FIG. 1.

The first and second planetary gear sets 40, 42 disposed on the input shaft 22, clutches C0, C1, C2, brakes B1, B2 and the one-way clutch F1 constitute a primary speed-ratio changing portion MG capable of establishing four forward-drive gear ratios and one rear-drive gear ratio. The third planetary gear set 46 disposed on the counter shaft 44, clutch C3, brake B3, and the one-way clutch F2 constitute a secondary speed-ratio changing portion or under-drive portion U/D. In the primary speed-ratio changing portion MG, the input shaft 22 is coupled to the carrier K2 of the second planetary gear set 42, the sun gear S1 of the first planetary gear set 40 and the sun gear S2 of the second planetary gear set 42, via the clutches C0, C1, C2, respectively. The ring gear R1 of the first planetary gear set 40 is coupled to the carrier K2 of the second planetary gear set 42, and the ring gear R2 of the second planetary gear set 42 is coupled to the carrier K1 of the first planetary gear set 40. The sun gear S2 of the second planetary gear set 42 is connected to the housing 28 as a non-rotating or stationary member via the brake B1, and the ring gear R1 of the first planetary gear set 40 is connected to the housing 28 via the brake B2. The one-way clutch F1 is provided between the carrier K2 of the second planetary gear set 42 and the housing 28. A first counter gear GI fixed to the carrier K1 of the first planetary gear set 40 meshes with a second counter gear G2 fixed to the ring gear R3 of the third planetary gear set 46. In the under-driver portion U/D, the carrier K3 and the sun gear S3 of the third planetary gear set 46 are coupled to each other via the clutch C3, and the brake B3 and the one-way clutch F2 are disposed in parallel with each other between the sun gear S3 and the housing 28.

Each of the clutches C0, C1, C2, C3 and the brakes B1, B2, B3 is a hydraulically operated friction element, such as a multiple disc clutch or a band brake, which is engaged or released in a controlled manner by a hydraulic actuator. With the corresponding hydraulic actuators operated, the clutches C0, C1, C2, C3 and the brakes B1, B2, B3 are selectively engaged so that one of the five forward-drive gear or speed ratios is established, as shown in FIG. 2. In FIG. 2, "O" means "engaged", and "Δ" means "engaged only during driving", while "X" means "released". In FIG. 2, shift (4→5 shift or 5→4 shift) between the fourth gear ratio and the fifth gear ratio is accomplished by engaging or releasing the clutch C3, and shift (1→2 shift or 2→1 shift) between the first gear ratio and the second gear ratio is accomplished by engaging or releasing the brake B1. While only one friction element is engaged or released in the above cases, shift (2→3 shift or 3→2 shift) between the second gear ratio and the third gear ratio is accomplished by releasing the brake B1 and engaging the clutch C0 or by releasing the clutch C0 and engaging the brake B1. Namely, 2→3 shift or 3→2 shift is accomplished by effecting a so-called clutch-to-clutch shift, which means simultaneous release of one friction element and engagement of another friction element. Similarly, shift (3→4 shift or 4→3 shift) between the third gear ratio and the fourth gear ratio is also a clutch-to-clutch shift effected by releasing the clutch C1 and engaging the brake B1, or releasing the brake B1 and engaging the clutch C1.

Figure 3:
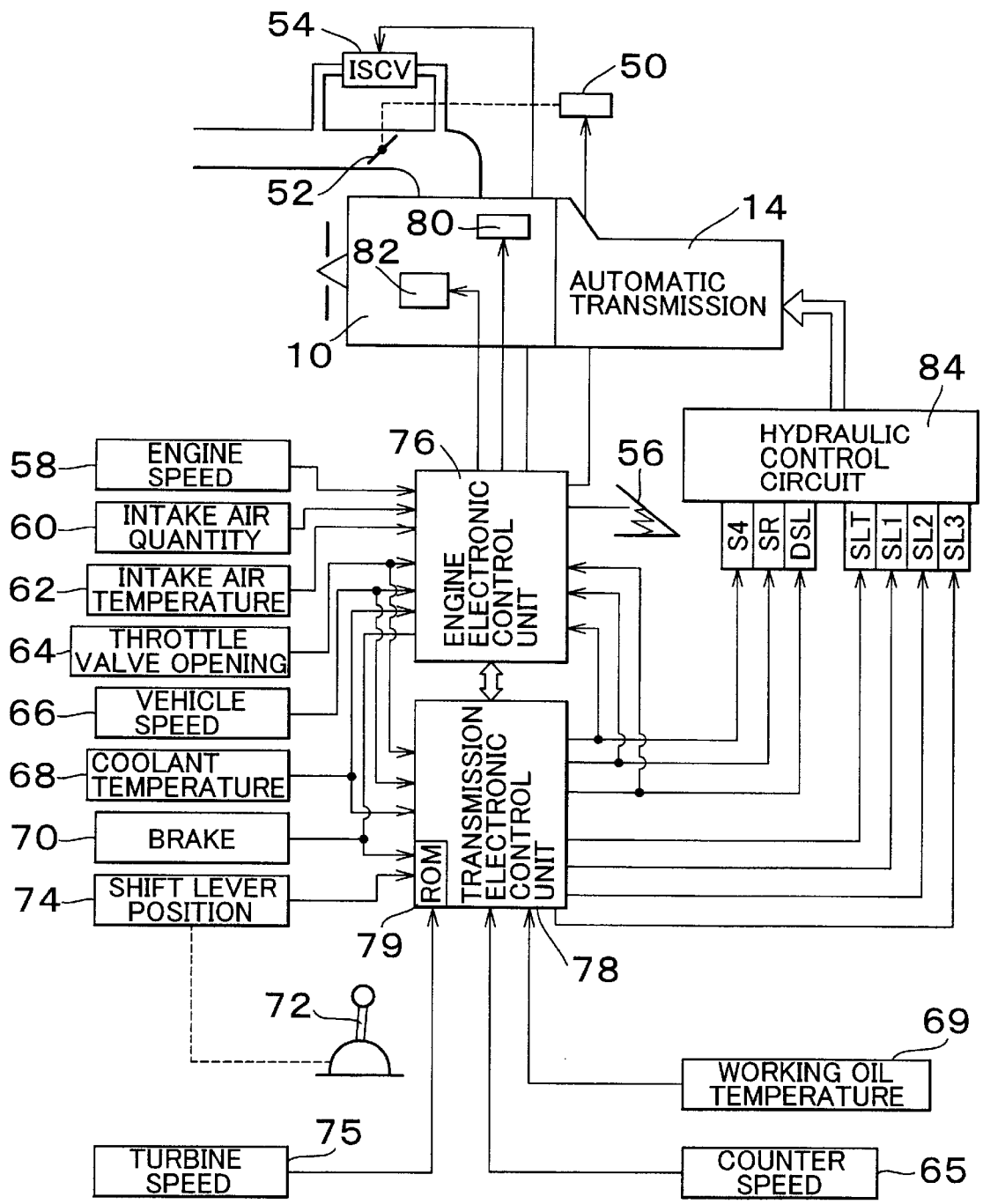
FIG. 3 is a block diagram for explaining an electronic control unit and other units provided in the vehicle for controlling the automatic transmission of FIG. 1.

Referring next to FIG. 3, a throttle valve 52 that is driven by a throttle actuator 50 and an ISC valve 54 disposed in parallel with the throttle valve 52 are provided in an intake pipe of the engine 10 of the vehicle. The ISC valve 54 serves to control the engine speed $N_E$ during idling. The opening angle θ of the throttle valve 52 is controlled in accordance with the amount by which the accelerator pedal 56 is operated such that the opening angle θ increases with the operated amount of the accelerator pedal 56. An electronic control unit 76 for controlling the engine 10 and an electronic control unit 78 for controlling the automatic transmission 14 are adapted to receive various signals indicative of engine conditions, transmission conditions and others from various sensors. Such sensors include an engine speed sensor 60 for detecting a speed $N_E$ of rotation of the engine 10, an intake air quantity sensor 60 for detecting an intake air quantity Q of the engine 10, an intake air temperature sensor 62 for detecting a temperature $T_A$ of the intake air, a throttle sensor 64 for detecting an opening angle θ of the throttle valve 52, and a counter speed sensor 65 for detecting a speed Nc of rotation of the second counter gear G2 (which will be called "counter speed"). The sensors further include a vehicle speed sensor 66 for detecting a vehicle speed V, a coolant temperature sensor 68 for detecting a coolant temperature Tw of the engine 10, and a working oil temperature sensor 69 for detecting a working oil temperature $T_{OIL}$ of the automatic transmission 14, a brake switch 70 for detecting brake application, a range sensor 74 for detecting an operated position (i.e., selected range) of the shift lever 72, and a turbine speed sensor 75 for detecting a speed of rotation of the turbine blade 24, or turbine speed $N_T$ (=rotation speed of the input shaft 22 or rotation speed of the output shaft of the torque converter 12). From these sensors, the electronic control unit 76 for engine control (hereinafter simply called "engine control unit 76") and the electronic control unit 78 for transmission control (hereinafter simply called "transmission control unit 78") receive signals indicative of the engine speed $N_E$, intake air quantity Q, intake air temperature $T_A$, throttle opening θ, counter speed Nc, vehicle speed V, engine coolant temperature Tw, working oil temperature $T_{OIL}$, operating state BK of the brake, operated position Psh of the shift lever 72, and the turbine speed $N_T$.

Figure 4:
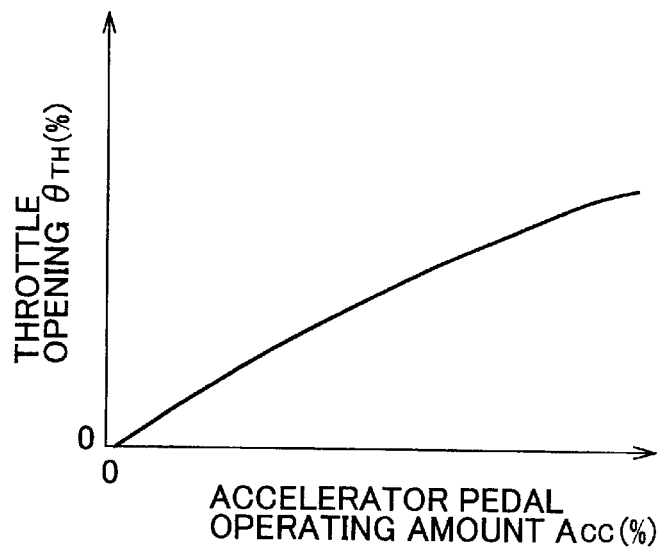
FIG. 4 is a graph showing a relationship between an operated amount of an accelerator pedal and an opening angle of a throttle valve, which relationship is used by the electronic control unit for engine in FIG. 3 for controlling the opening angle of the throttle valve.

The engine control unit 76 mainly includes a so-called microcomputer incorporating a CPU, a RAM, a ROM and input and output interfaces. The CPU processes input signals according to programs stored in advance in the ROM, while utilizing the temporary storage function of the RAM, so as to perform various engine control operations. For example, the engine control unit 76 controls a fuel injection valve 80 for each cylinder for controlling the amount of fuel injection, and controls an igniter 82 for each cylinder for controlling the ignition timing. The engine control unit 76 also controls the opening θ of the throttle valve 52 based on the actual operated amount of the accelerator pedal 56, according to a pre-stored relationship as shown in FIG. 4, such that the throttle opening θ increases with the operated amount of the accelerator pedal 56. The engine control unit 76 further controls the ISC valve 54 for controlling the idle speed or increasing the engine speed $N_E$ by a certain amount.

Figure 5:
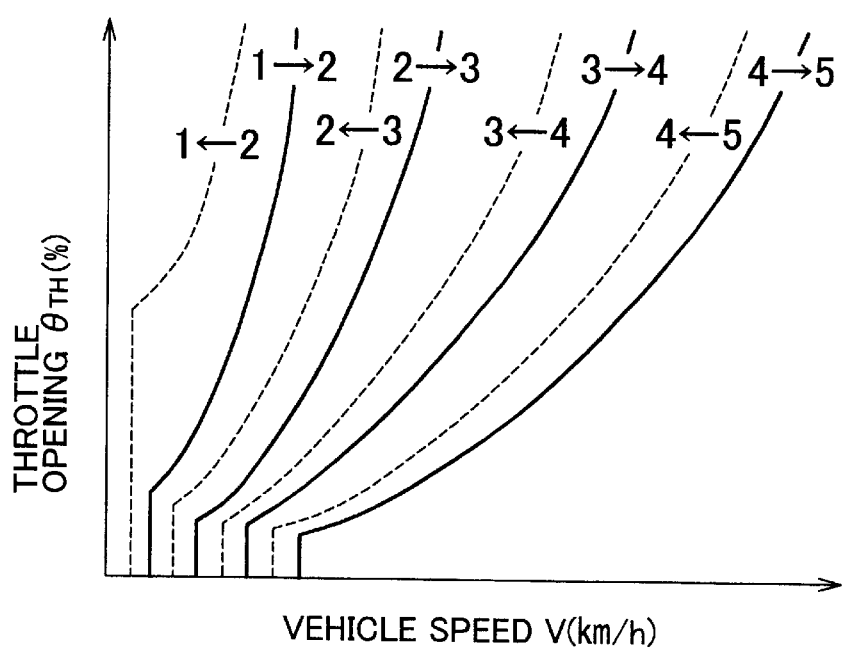
FIG. 5 is a shift diagram used for shift control of the automatic transmission by the electronic control unit for transmission as shown in FIG. 3.

Similarly, the transmission control unit 78 mainly includes a microcomputer incorporating a CPU, a RAM, a ROM 79 and input and output interfaces. The CPU processes input signals according to programs stored in advance in the ROM 79 while utilizing the temporary storage function of the RAM, so as to drive appropriate solenoid-operated valves and linear solenoid valves of a hydraulic control circuit 84. For example, the transmission control unit 78 determines a desired gear ratio of the transmission 14 and engagement/release of the lock-up clutch 24 based on the actual throttle opening θ and the vehicle speed V, according to a pre-stored shift diagram as shown in FIG. 5, for example. The transmission control unit 78 then drives solenoid-operated valves S4, SR, linear solenoid valves SLT, SL1, SL2, SL3 and so on, so as to establish the gear ratio thus determined, and realizes the engaged or released state of the lock-up clutch 24.

Figure 6:
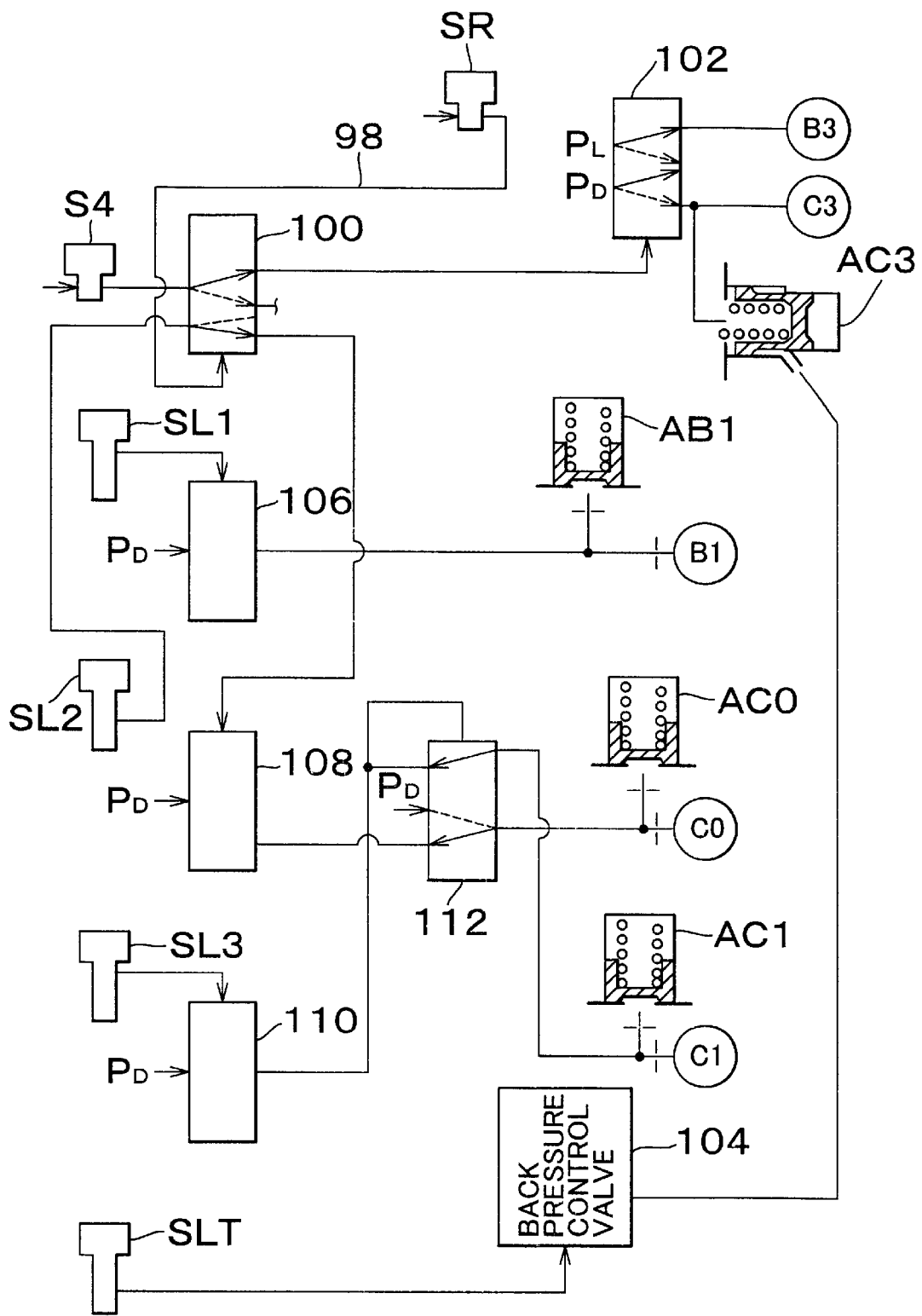
FIG. 6 is a schematic view showing a hydraulic circuit for explaining the arrangement of a principal part of a hydraulic control circuit as shown in FIG. 3.

FIG. 6 simply illustrates a principal part of the hydraulic control circuit 84. Referring to FIG. 6, the solenoid-operated valve SR applies its output pressure to a 2–3 shift valve 100 through a relatively long oil passage 98 in response to a command signal from the transmission control unit 78, so that the 2–3 shift valve 100 is placed in a selected one of two positions, of which one position is selected for establishing the first and second gear ratios and the other position is selected for establishing the third to fifth gear ratios. The solenoid-operated valve S4 applies its output pressure to a 4–5 shift valve 102 via the 2–3 shift valve 100 placed in the other position for the third to fifth gear ratios, according to a command signal from the transmission control unit 78, so that the 4–5 shift valve 102 is placed in a selected one of two positions, of which one position is selected for establishing the first to fourth gear ratios and the other position is selected for establishing the fifth gear ratio. Namely, when the 4–5 shift valve 102 is placed in the above-indicated one position corresponding to the first to fourth gear ratios, its forward-drive range pressure or D range pressure $P_D$ is applied to the brake B3. When the 4–5 shift valve 102 is placed in the other position corresponding to the fifth gear ratio, the D range pressure $P_D$ is applied to the clutch C3 and the accumulator AC3. The linear solenoid valve SLT applies its output pressure to a back-pressure control valve 104 in response to a command signal from the transmission control unit 78, so as to generate a back pressure corresponding to the output pressure, which is then to be supplied to a back-pressure port of the accumulator AC3.

The linear solenoid valve SL1 applies its output pressure to a B1 control valve 106 in response to a command signal from the transmission control unit 78, so as to cause the B1 control valve 106 to generate and regulate an engaging pressure $P_{B1}$ corresponding to the output pressure, which is then applied to the brake B1 and its accumulator AB1. The linear solenoid valve SL2 applies its output pressure to a C0 control valve 108 via the $_{2-3}$ shift valve 100 that is switched by the solenoid-operated valve SR, in response to a command signal from the transmission control unit 78, so as to cause the C0 control valve 108 to generate and regulate an engaging pressure $P_{C0}$ corresponding to the output pressure, which is then applied to the clutch C0 and its accumulator AC0. The linear solenoid valve SL3 applies its output pressure to a C1 control valve 110 in response to a command signal from the transmission control unit 78, so as to generate and regulate an engaging pressure $P_{C1}$ corresponding to the output pressure, which is then applied to the clutch C1 and its accumulator AC1.

Figure 7:
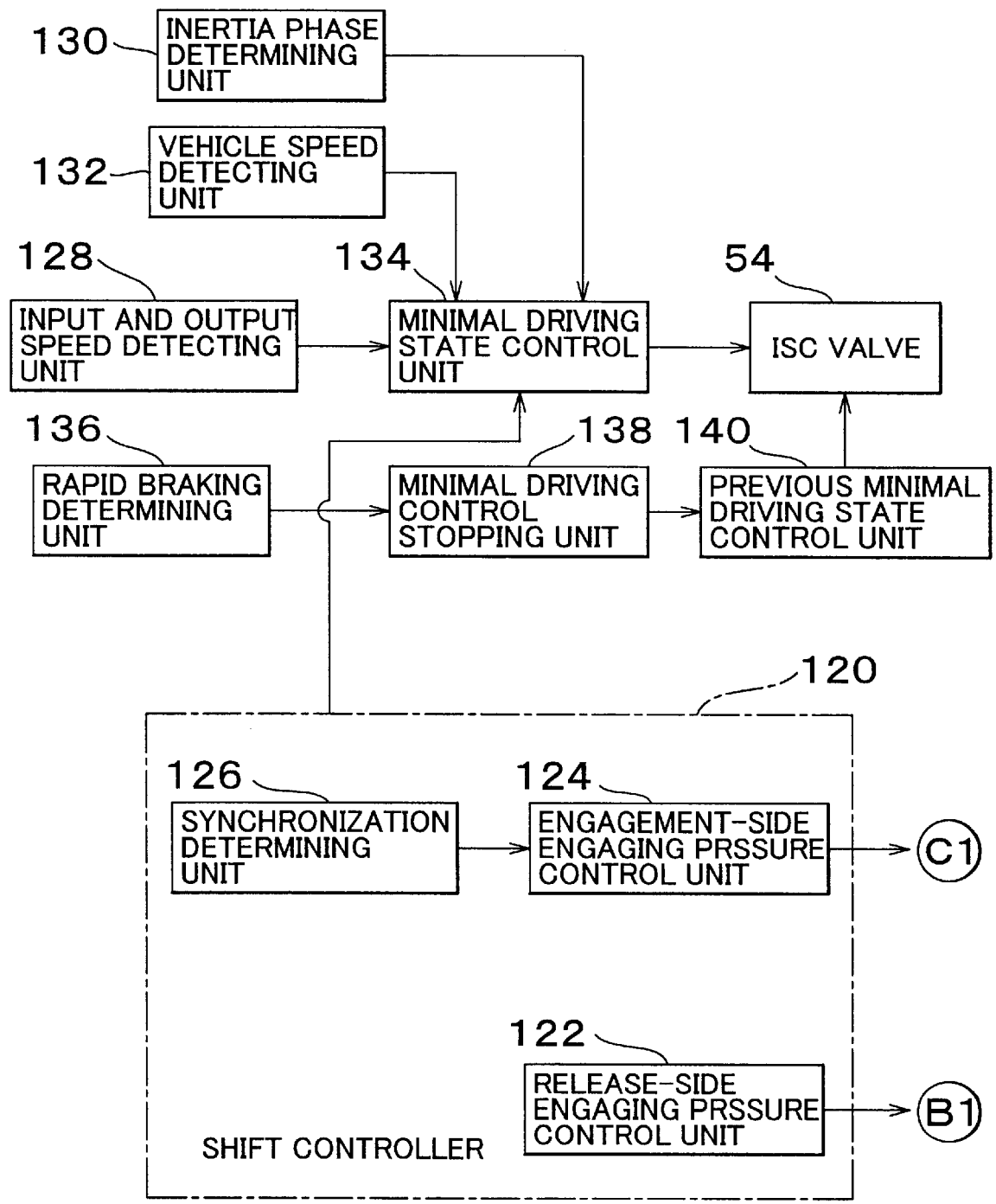
FIG. 7 is a function block diagram for explaining an example of control functions performed by the electronic control unit for transmission as shown in FIG. 3.
Figure 14:
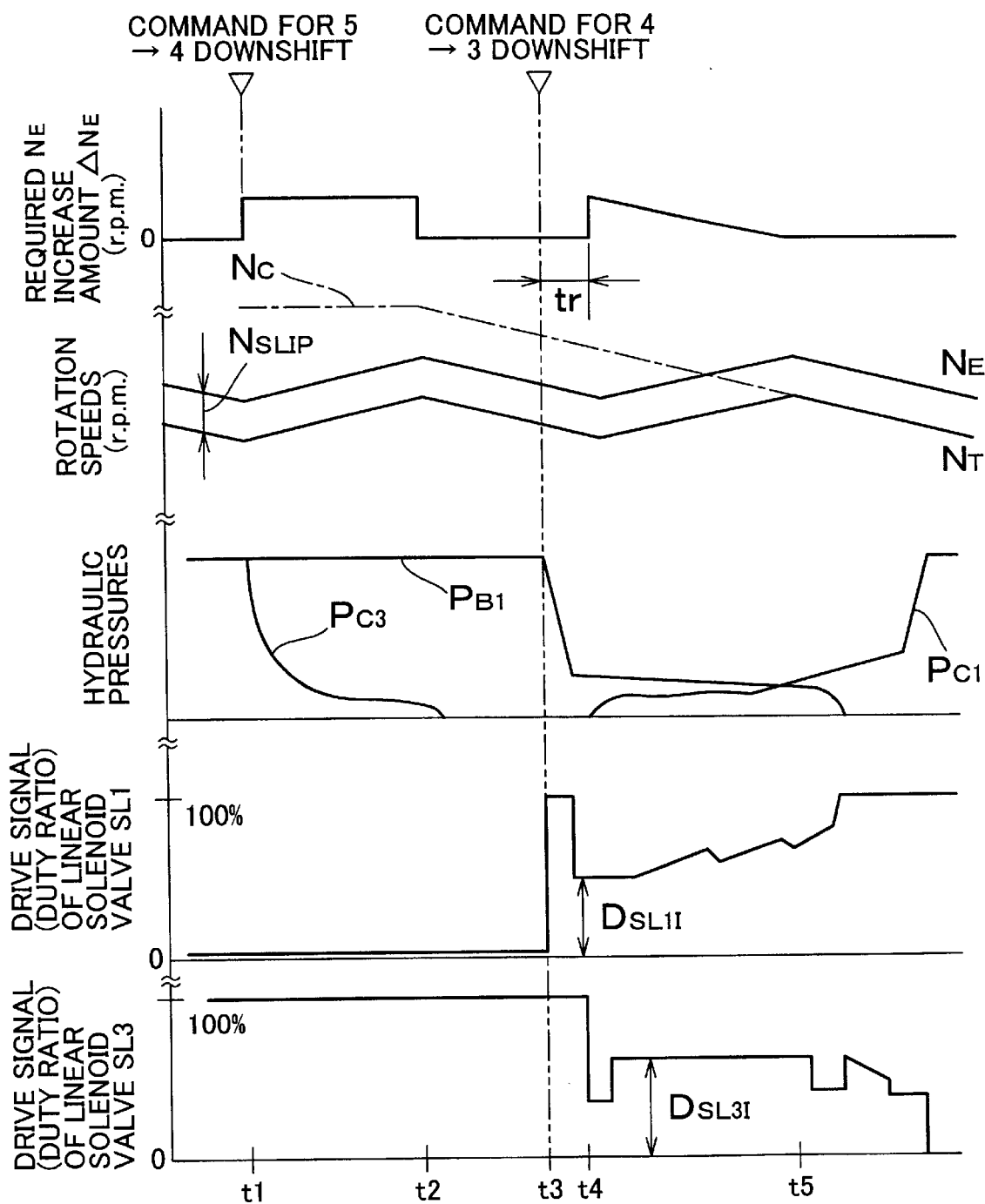
FIG. 14 is a time chart showing control operations performed by the transmission control unit as shown in FIG. 3.

FIG. 7 is a function block diagram for explaining control functions of the transmission control unit 78. A shift controller 120 determines a gear ratio to be established (i.e., determines whether the transmission 14 should be shifted up or down) based on actual vehicle conditions including, for example, the vehicle speed V and the throttle opening angle θ or the operated amount of the accelerator pedal, in accordance with the pre-stored relationship as indicated in FIG. 5. The shift controller 120 then generates a shift output signal so as to effect the upshift or downshift determined by the shift controller 120. If a point representing the vehicle conditions in the shift diagram of FIG. 5 passes a 5→4 downshift boundary to the lower-speed (fourth-speed) side, the shift controller 120 determines that a 5→4 downshift should be effected, and causes the solenoid-operated valve S4 to switch the 4→5 shift valve 102 to the fourth-speed side to thereby release the clutch C3. If a point representing the vehicle conditions in the shift diagram of FIG. 5 passes a 4→3 downshift boundary to the lower-speed (third-speed) side, the shift controller 120 determines that a 4→3 downshift should be effected. To accomplish the 4→3 downshift, controlled output (drive) signals are applied to the linear solenoid valves SL1 and SL3 so as to generate engaging pressures $P_{B1}$, and $P_{C1}$ for releasing the brake B1 and engaging the clutch C1. As shown in FIG. 14, for example, the output signals applied to the linear solenoid valves SL1, SL3 are controlled by changing their duty ratios. In this embodiment in which the linear solenoid valves SL1, SL3 are of normally open type (in which the solenoid valves SL1, SL3 are normally in the open state when not energized), the output pressure $P_{B1}$, and $P_{C1}$ is made equal to zero when the duty ratio of the signal supplied to the linear solenoid valve SL1, SL4 is 100%.

The shift controller 120 includes a release-side engaging pressure control unit 122, an engagement-side engaging pressure control unit 124 and a synchronization determining unit 126, which cooperate with each other to favorably accomplish the above-described 4→3 downshift during coasting. More specifically, the release-side engaging pressure control unit 122 controls the engaging pressure $P_{B1}$ for the brake B1 as a release-side hydraulically operated friction element, and the engagement-side engaging pressure control unit 124 controls the engaging pressure $P_{C1}$ for the clutch C1 as an engagement-side hydraulically operated friction element. The synchronization determining unit 126 determines synchronization of rotation of the clutch C1 which indicates completion of the 4→3 downshift, by determining that the turbine speed $N_T$ coincides with the counter speed $N_C$. The release-side engaging pressure control unit 122 and the engagement-side engaging pressure control unit 124 sequentially change the engaging pressure $P_{B1}$ of the brake B1 and the engaging pressure $P_{C1}$ of the clutch C1 from the start to the end of the downshift, according to predetermined programs or feedback control scheme. For example, the release-side engaging pressure control unit 122 determines a release initial pressure $P_{B1I}$ based on a difference $N_{SLIP}$ (=$N_E$-$N_T$) between the input and output shaft speeds of the torque converter 12 and the counter speed $N_C$, according to a stored relationship as shown in FIG. 8, for example, and sends a drive signal $DP_{B1I}$ for maintaining the release initial pressure $P_{B1I}$ to the linear solenoid valve SL1. Also, the engagement-side engaging pressure control unit 124 determines an engaging initial pressure $P_{C1I}$ based on a difference $N_{SLIP}$ (=$N_E$-$N_T$) between the input and output shaft speeds of the torque converter 12 and the counter speed $N_C$, from a stored relationship similar to that as shown in FIG. 8, and sends a drive signal $DP_{C1I}$ for maintaining the engaging initial pressure $P_{C1I}$, to the linear solenoid valve SL3. According to the relationship as shown in FIG. 8, the initial hydraulic pressure increases as the input and output speed difference $N_{SLIP}$ increases and as the counter speed $N_C$ decreases. In the clutch-to-clutch 4→3 downshift as described above, the brake B1 and the clutch C1 are maintained at the release initial pressure $P_{B1I}$ and the engaging initial pressure $P_{C1I}$, such that the clutch C1 as an oncoming friction element is gradually engaged while the brake B1 as an offgoing friction element is slipping in such a manner that a tie-up condition or racing (rapid increase) of the input shaft speed of the transmission 14 is suppressed to be kept lower than certain levels. When the synchronization determining unit 126 determines synchronization of rotation of the clutch C1 that indicates completion of the 4→3 downshift, the engagement-side engaging pressure control unit 124 controls the duty ratio of a drive signal $D_{C1}$ for the linear solenoid SL3 to 0%, thereby to raise the engaging pressure $P_{C1}$ of the clutch C1 to a predetermined value, for example, to a maximum value.

Referring back to FIG. 7, an input and output speed detecting unit 128 calculates a difference $N_{SLIP}$ (=$N_E$-$N_T$)

between the input and output shaft speeds of the torque converter 12 as a fluid coupling device during coasting of the vehicle, based on the engine speed $N_E$ and the turbine speed $N_T$. An inertia phase determining unit 130 determines a start point of the inertia phase or its vicinity during the 4→3 downshift, by detecting a point of time at which the engine speed $N_E$ or the turbine speed $N_T$ starts increasing, or by determining that a preset time has passed since an output signal for effecting a 4→3 downshift is generated. Here, the time or period $t_T$ from generation of the output signal for 4→3 downshift to a point when the turbine speed $N_T$ starts increasing is referred to as "torque phase" of 4→3 downshift. A vehicle-speed detecting unit 132 detects a vehicle speed V or a speed of rotation of another member that varies with the vehicle speed V. For example, the vehicle-speed detecting unit 132 detects the counter rotation speed $N_C$ if the gear ratio of the transmission 14 is equal to or less than the fourth gear ratio.

After an output signal for effecting a 4→3 downshift is generated during coasting of the vehicle, a minimal driving state control unit 134 determines an engine speed increase $\Delta N_E$ (r.p.m.) based on an average value $N_{SLIPAV}$ of the difference $N_{SLIP}$ between the input and output shaft speeds of the torque converter during a predetermined period prior to the current moment, based on a stored relationship as shown in FIG. 9, for example. The control unit 134 then outputs a required ISC drive amount for providing the engine speed increase $\Delta N_E$ to the ISC valve 54. As a result, the vehicle is brought into a minimal driving state in which the engine speed $N_E$ is slightly higher than the turbine speed $N_T$ by a relatively small predetermined value. According to the above-indicated relationship of FIG. 9, the engine speed increase $\Delta N_E$ decreases as the average value $N_{SLIPAV}$ increases. With the control as described above, the input and output speed difference $N_{SLIP}$ is maintained at a substantially constant value, which is relatively small, during coasting of the vehicle. The minimal driving state control unit 134 carries out minimal drive control for bringing the vehicle into a minimal driving state, from the start point of the inertia phase at which the rotation speed $N_T$ of a rotating element, such as the turbine blade 24, starts changing (increasing) during a 4→3 downshift, after an output signal for the 4→3 downshift is generated during coasting of the vehicle. The minimal driving state control unit 134 also determines the rate of decrease of the engine speed increase $\Delta N_E$ based on the rate of decrease of the counter speed $N_C$ or the actual vehicle, speed V, according to a stored relationship as shown in FIG. 10, and reduces the engine speed increase $\Delta N_E$ at the determined rate in real time. When a brake is applied to the vehicle during the period of the 4→3 coast downshift, therefore, the engine rotation increase $\Delta N_E$ is reduced at the determined rate in relation to the rate of reduction in the counter speed $N_C$, whereby the input and output speed difference $N_{SLIP}$ is continuously reduced.

A rapid braking determining state 136 determines whether a brake is rapidly applied to the vehicle, for example, by determining whether a rate of change of the vehicle speed or deceleration calculated from the vehicle speed V, a force applied to operate the brake pedal, a braking oil pressure, or the like, exceeds a criterion or reference value. A minimal driving control stopping unit 138 immediately stops a minimal driving control which has been executed by a previous minimal driving state control unit 140 after an output signal for effecting a 5→4 coast downshift was generated. More specifically, the minimal driving control is stopped by setting the engine speed increase $\Delta N_E$ to zero. The minimal driving control executed by the previous minimal driving state control unit 140 is similar to the minimal driving control executed by the above-described minimal driving state control unit 134.

Figure 11:
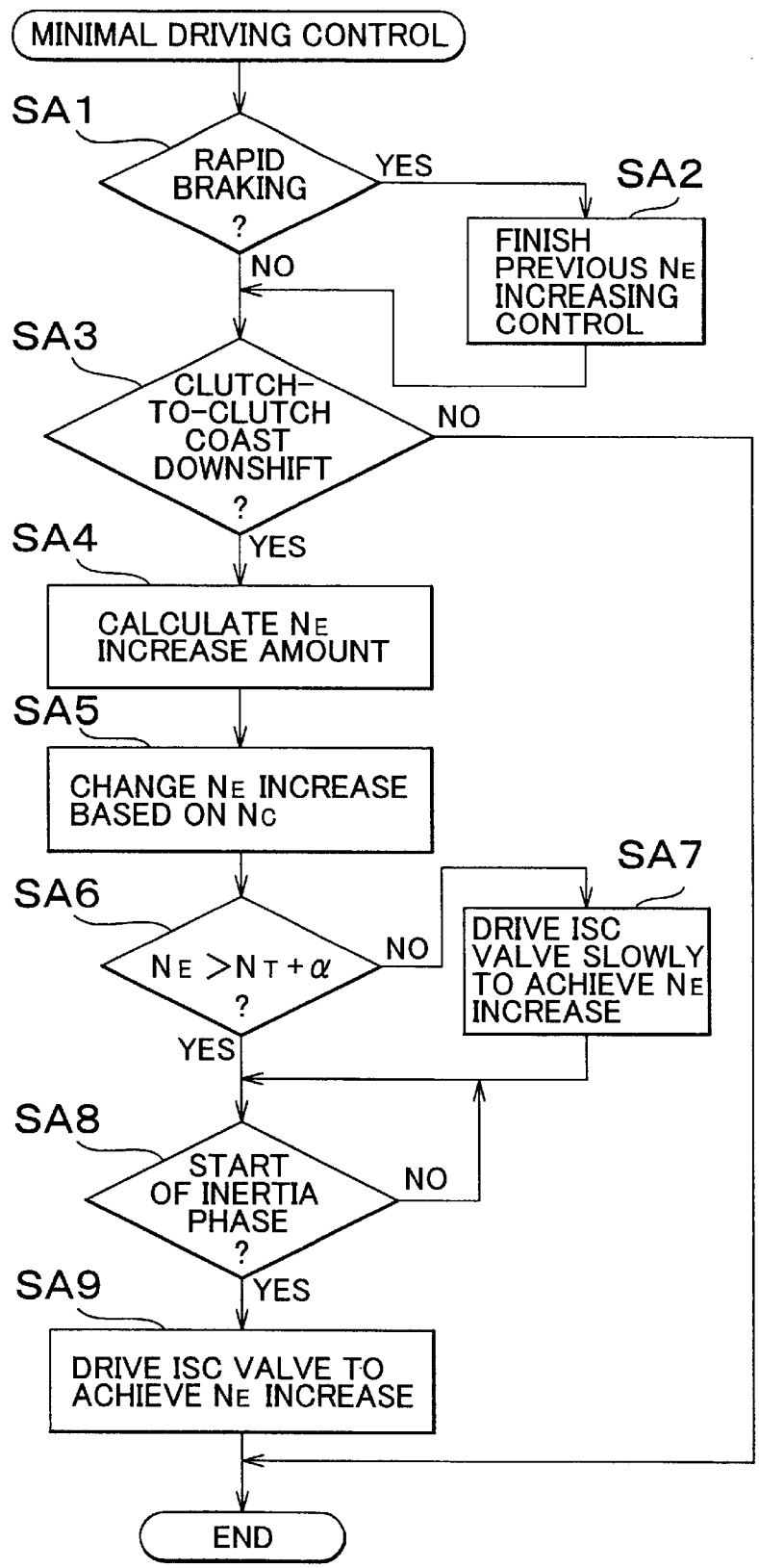
FIG. 11 is a flowchart showing a minimal driving control routine executed by the transmission control unit as shown in FIG. 3.
Figure 12:
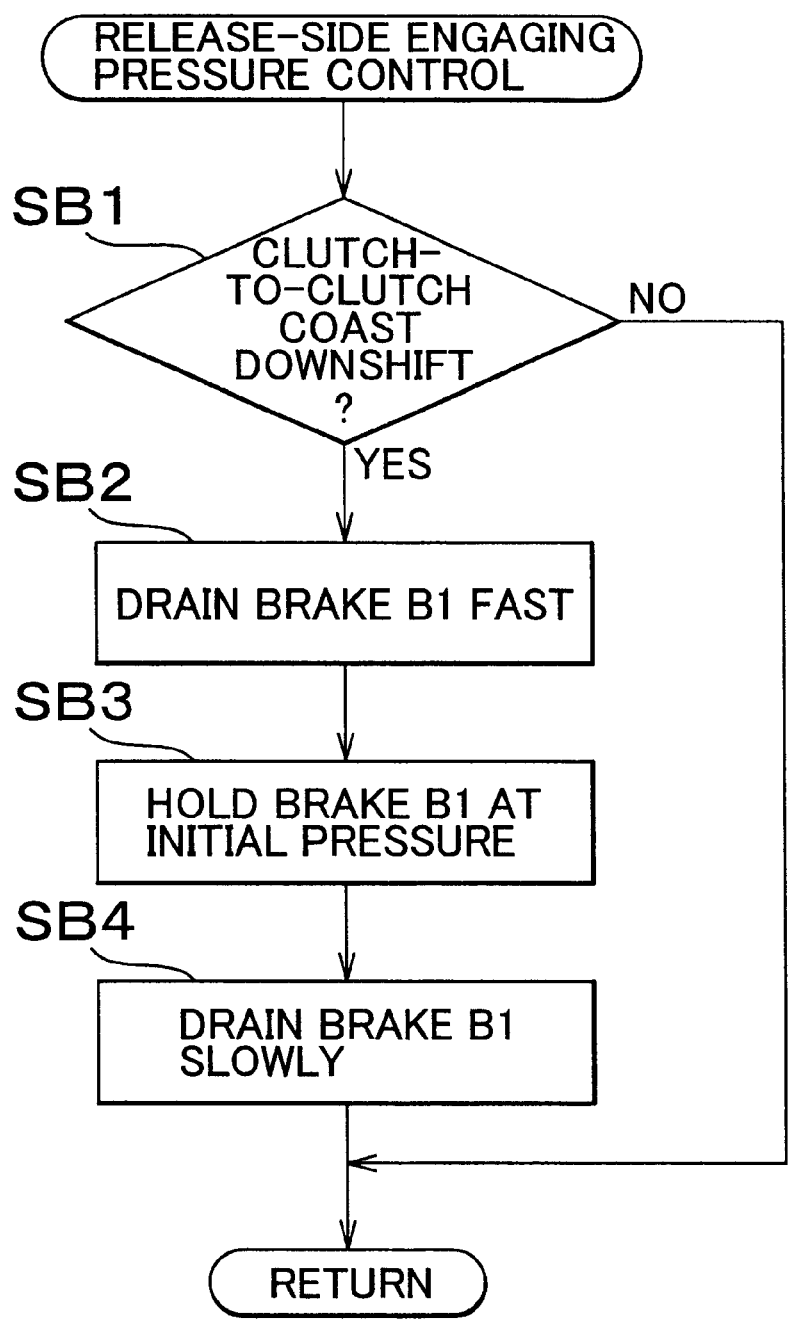
FIG. 12 is a flowchart showing a release-side engaging pressure control routine executed by the transmission control unit as shown in FIG. 3.
Figure 13:
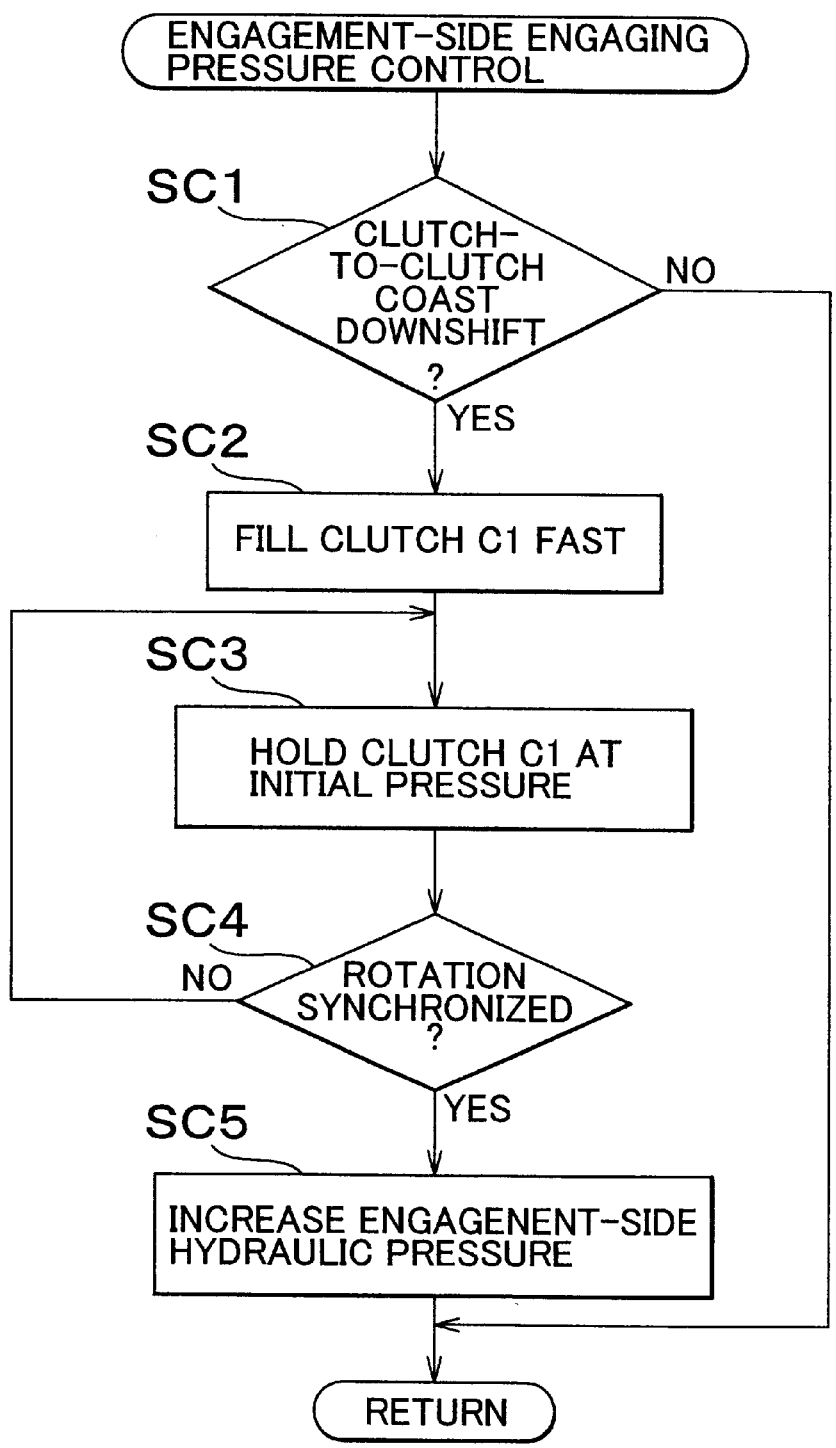
FIG. 13 is flowchart showing an engagement-side engaging pressure control routine executed by the transmission control unit as shown in FIG. 3.

FIG. 11, FIG. 12 and FIG. 13 are flowcharts for explaining control operations performed by the transmission control unit 78. FIG. 11 illustrates a minimal driving control routine for placing the vehicle in a minimal driving state during a coast-down period, FIG. 12 illustrates a release-side engaging pressure control routine executed at the time of a clutch-to-clutch downshift during coasting, and FIG. 13 illustrates an engagement-side engaging pressure control routine executed at the time of a clutch-to-clutch downshift during coasting.

The minimal driving control routine of FIG. 11 is initiated after an output signal for a previous downshift, e.g., 5→4 downshift, is generated during coasting of the vehicle. In step SA1 of FIG. 11 corresponding to the rapid braking determining unit 136, it is determined whether a brake is rapidly applied to the vehicle. If an affirmative decision (YES) is obtained in step SA1, step SA2 corresponding to the minimal driving control stopping unit 138 is executed to stop the minimal driving control that has been executed after an output signal for the previous downshift (e.g., 5→4 downshift) was generated. Point $t_2$ in FIG. 14 indicates the time when the minimal driving control is stopped after an output signal for the 5→4 downshift was generated. If a negative decision (NO) is obtained in step SA1, it is determined in step SA3 corresponding to the shift controller 120 whether a clutch-to-clutch downshift, i.e., a 4→3 downshift, is to be effected during coasting. If a negative decision (NO) is obtained in step SA3, the present routine is terminated. If an affirmative decision (YES) is obtained in step SA3, step SA4 is executed to determine an engine speed increase $\Delta N_E$ (r.p.m.) based on the average value $N_{SLIPAV}$ of the difference $N_{SLIP}$ between the input and output shaft speeds of the torque converter during a predetermined period prior to the current moment, based on the stored relationship as shown in FIG. 9, for example. In step SA5, the rate of decrease of the engine speed increase $\Delta N_E$ is determined based on the rate of decrease of the actual vehicle speed V or counter speed $N_C$ from the stored relationship as shown in FIG. 10, for example, and the engine speed increase $\Delta N_E$ is reduced at the determined rate in real time, so that the degree of the minimal driving state is reduced in accordance with the rate of decrease of the counter speed $N_C$. In this manner, the input and output speed difference $N_{SLIP}$ is continuously reduced.

In step SA6, it is determined whether the engine speed $N_E$ is higher than the turbine speed ($N_T + \alpha$). Here, $\alpha$ is defined as a margin used for determining that $N_{SLIP}$ stably or reliably takes a positive value. This step (SA6) is provided for switching the control mode depending upon which one of the engine speed $N_E$ and the turbine speed $N_T$ is greater than the other. Point $t_3$ in FIG. 14 indicates the time when step SA6 is executed. If a negative decision (NO) is obtained in step SA6, that indicates a special situation in which the engine speed $N_E$ is lower than the turbine speed $N_T$, which situation may occur when the engine suffers large friction upon start thereof, or when the engine load becomes large due to the operation of the air conditioner. To deal with this situation, step SA7 is executed to determine a drive signal to the ISC valve 54 so that the ISC valve 54 is slowly driven at a predetermined rate until the engine speed increase $\Delta N_E$ determined in step SA5 is achieved. If an affirmative decision (YES) is obtained in step SA6, on the other hand, the vehicle is in the minimal driving state in which the engine speed $N_E$ is slightly higher than the turbine speed $N_T$, and step SA8 and the following steps are executed.

If the engine speed increase $\Delta N_E$ is determined as described above, step SA8 corresponding to the inertia phase determining unit 130 is executed to determine the initiation of the inertia phase following the torque phase of the 4→3 downshift by detecting a point of time at which the turbine speed $N_T$ starts changing (increasing). Step SA8 is repeatedly executed as long as a negative decision (NO) is obtained in step SA8. If an affirmative decision (YES) is obtained in step SA8, step SA9 is executed to output a required ISC drive amount for providing the determined engine speed increase $\Delta N_E$ to the ISC valve 54, and keep the vehicle in the minimal driving state in which the engine speed $N_E$ is slightly higher than the turbine speed $N_T$. In FIG. 14, the required ISC drive amount is output to the ISC valve 54 at a point of time $t_4$, at which the minimal driving state is initiated after an output signal for the 4→3 downshift is generated. Since the counter speed $N_C$ is serially reduced due to braking after the time $t_4$ in FIG. 14, the engine speed increase $\Delta N_E$ is also reduced with a reduction in the counter speed Nc, whereby the input and output speed difference $N_{SLIP}$ is continuously reduced during the period of 4→3 downshift.

Next, hydraulic control operations performed after time $t_3$ in FIG. 14 for effecting the 4→3 clutch-to-clutch downshift during coasting of the vehicle will be now explained with reference to FIG. 12 and FIG. 13. FIG. 12 illustrates an operation to control the engaging pressure $P_{B1}$ of the brake B1 serving as a release-side hydraulically operated friction element during the 4→3 downshift, and FIG. 13 illustrates an operation to control the engaging pressure $P_{C1}$ of the clutch C1 serving as an engagement-side hydraulically operated friction element during the 4→3 downshift. In the present embodiment, the 4→3 downshift takes place during braking, as is understood from changes in the counter speed $N_C$ after time $t_2$ in FIG. 14.

In FIG. 12, step SB1 is executed to determine whether an output signal for a 4→3 clutch-to-clutch downshift is generated. If a negative decision (NO) is obtained in step SB1, the present routine is terminated. If an affirmative decision (YES) is obtained in step SB1, step SB2 is executed to temporarily control the duty ratio of the drive signal of the linear solenoid valve SL1 to 100%, to perform a fast drain, namely, an initial operation to rapidly discharge or drain working oil from the brake B1. In step SB3, the initial pressure $P_{B1}$ is determined based on the actual input and output rotation speed difference $N_{SLIP}$ and the counter speed $N_C$, from the stored relationship as shown in FIG. 8, for example, and the duty cycle of the drive signal of the linear solenoid valve SL1 is maintained at $D_{SL1f}$ so as to hold the brake B1 at the initial pressure $P_{B1f}$ for a predetermined period. In some cases, the initial pressure $P_{B1f}$ may be corrected through learning so that the 4→3 downshift is smoothly accomplished. In step SB4, the duty ratio of the drive signal of the linear solenoid valve SL1 is slowly increased through rotation speed feedback control, so that the brake B1 is drained at a relatively small rate.

In FIG. 13, step SC1 is executed to determine whether an output signal for a 4→3 clutch-to-clutch downshift is generated. If a negative decision (NO) is obtained in step SC1, the present routine is terminated. If an affirmative decision (YES) is obtained in step SC1, the duty ratio of the drive signal of the linear solenoid valve SL3 is temporarily reduced after the brake B1 is drained fast, and working oil is quickly supplied to the clutch C1 through the linear solenoid valve SL3 so as to fill the clutch C1 fast in step SC2. In step SC3, the initial pressure $P_{C1f}$ is determined based on the actual input and output speed difference $N_{SLIP}$ and the counter speed $N_C$, from the stored relationship as shown in FIG. 8, for example, and the duty ratio of the drive signal of the linear solenoid SL3 is maintained at $D_{SL3f}$ so as to hold the clutch C1 at the initial pressure $P_{C1f}$ for a predetermined period. As a result, the release-side brake B1 and the engagement-side clutch C1 are both brought into slipping states, and the engagement torque of the brake B1 is reduced while at the same time the engagement torque of the clutch C1 is increased. In some cases, the initial pressure $P_{C1f}$ may be corrected through learning so that the 4→3 downshift is smoothly accomplished. In step SC4 corresponding to the synchronization determining unit 126, it is determined whether synchronization of rotation of the clutch C1 that indicates establishment of the third gear ratio has occurred, namely, whether the counter speed $N_C$ becomes equal to the turbine speed $N_T$. If a negative decision (NO) is obtained in step SC4, steps SC3 and SC4 are repeatedly executed. If an affirmative decision (YES) is obtained in step SC4, the engaging pressure PC1 of the clutch C1 starts being increased in step SC5, as indicated at time $t_5$ in FIG. 14. As indicated by the duty ratio ($D_{SL31}$) of the drive signal applied to the linear solenoid valve SL3 in FIG. 14, the engaging pressure $P_{C1}$ is quickly changed in an upward direction at the time of the synchronized rotation of the clutch C1, and is then increased at a smaller rate until it reaches the maximum value.

In the embodiment as described above, the minimal driving state control unit 134 (steps SA4, SA5, SA9) controls the engine speed $N_E$ to increase by a controlled amount that is determined based on the actual input and output rotation speed difference $N_{SLIP}$ detected by the input and output speed detecting unit 128 when a clutch-to-clutch downshift is effected during coasting of the vehicle, so that the vehicle is kept in the minimal driving state during the clutch-to-clutch downshift. If the clutch-to-clutch downshift control is carried out in the minimal driving state during coasting, hydraulic pressures applied to the brake B1 and the clutch C1 associated with the shift can be controlled with high accuracy owing to reduced torque variation, and sufficient robustness can be achieved with respect to disturbances, such as braking of the vehicle.

In the present embodiment, the minimal driving state control unit 134 (SA4, SA5, SA9) reduces the increase amount $\Delta N_E$ of the engine speed that is controlled to be increased so as to place the vehicle in the minimal driving state, as the vehicle speed V decreases. If the vehicle speed V decreases during braking, therefore, the engine speed increase $\Delta N_E$ is also reduced, whereby the vehicle is advantageously held in the minimal driving state even during braking of the vehicle, during which the engine speed $N_E$ and the input and output speed difference $N_{SLIP}$ of the torque converter (fluid coupling device) 12 tend to increase. If the engine speed increase $\Delta N_E$ is not reduced in this situation, it would be difficult to engage the clutch C1 as the engagement-side friction element through hydraulic control at the time of completion of the 4→3 clutch-to-clutch downshift. In this embodiment, the engagement of the clutch C1 is easily accomplished at the time of completion of the shift.

In the present embodiment, the synchronization determining unit 126 (SC4) is provided for determining whether the clutch C1 as the engagement-side friction element associated with the 4→3 clutch-to-clutch downshift rotates in synchronism with elements, and the engagement-side engaging pressure control unit 124 (SC3, SC5) is provided for quickly increasing the engaging pressure $P_{C1}$ of the clutch C1 from the stand-by pressure when the synchronization determining unit 126 determines synchronization of rotation of the clutch C1. Thus, when synchronization of rotation of the clutch C1 is determined, the engaging pressure $P_{C1}$ of the clutch C1 is quickly increased from the stand-by pressure, whereby the shift is quickly completed without causing shift shock.

In the present embodiment, the rapid braking determining unit 136 (SA1) is provided for determining whether a brake is rapidly applied, and the minimal driving control stopping unit 136 (SA2) is provided for immediately stopping control of an increase amount of the engine speed for keeping the vehicle in the minimal driving state that has continued from the time when an output signal for 5→4 coast downshift was generated. With this arrangement, when it is determined that a brake is rapidly applied, the control of the increase amount of the engine speed for continuing the minimal driving state is immediately stopped, thus eliminating any influence on a subsequent 4→3 clutch-to-clutch downshift control during coasting of the vehicle.

According to the present embodiment, the minimal drive state control unit 134 starts control of the increase amount of the engine speed for placing the vehicle in the minimal driving state, from the start of the inertia phase of the 4→3 clutch-to-clutch downshift during coasting of th vehicle. Accordingly, the minimal driving state can be maintained after around the start of the inertia phase of the clutch-to-clutch shift that requires subtle hydraulic control. Thus, an influence of the minimal driving state that has continued from the previous coast downshift can be minimized.

While one exemplary embodiment of the invention has been described above with reference to FIG. 1 through FIG. 14, the invention may be otherwise embodied.

In the illustrated embodiment, the minimal driving state control unit 134 uses the ISC valve 54 for increasing the engine speed $N_E$ by the controlled amount. However, the minimal driving state control unit may use other engine speed control device, such as a the throttle actuator 50 for driving the throttle valve 52, the fuel injection valve(s) for adjusting the quantity of fuel injected into the engine 10, or an ignition timing control device for adjusting the ignition timing of the engine 10.

While the minimal driving state control unit 134 of the illustrated embodiment reduces the engine speed increase $\Delta N_E$ in accordance with the rate of decrease of the counter speed $N_C$ corresponding to the vehicle speed V, another parameter, such as a wheel rotation speed, may be used in place of the counter speed $N_C$.

While the minimal driving state control unit 134 of the illustrated embodiment starts minimal driving control from the start of the inertia phase of the 4→3 downshift, the minimal driving control need not be started from the start of the inertia phase, but may be started from any point of time after an output signal for a 4→3 downshift is generated.

While the input and output rotation speed difference $N_{SLIP}$ of the torque converter 12 is used in the illustrated embodiment, another type of fluid coupling may be used instead of the torque converter 12.

While the input and output rotation speed detecting unit 128 of the illustrated embodiment detects a difference $N_{SLIP}$ of the input and output shaft speeds of the torque converter 12, the detecting unit 128 may detect the ratio of the input and output rotation speeds. In this case, the input and output speed difference $N_{SLIP}$ as described above is replaced by the input and output speed ratio.

The automatic transmission 14 used in the illustrated embodiment may be of any other type. For example, while the automatic transmission 14 of the embodiment is constructed for use in a front-engine front-drive vehicle so as to provide five forward speed ratios, the transmission may be constructed so as to provide four or less forward speed ratios or six or more forward speed ratios, or may be constructed for use in a front-engine rear-drive vehicle.

While a 4→3 downshift of the automatic transmission 14 has been explained in the illustrated embodiment, the invention is also equally applicable to the cases of a 3→2 downshift and other downshifts.

Figure 15:
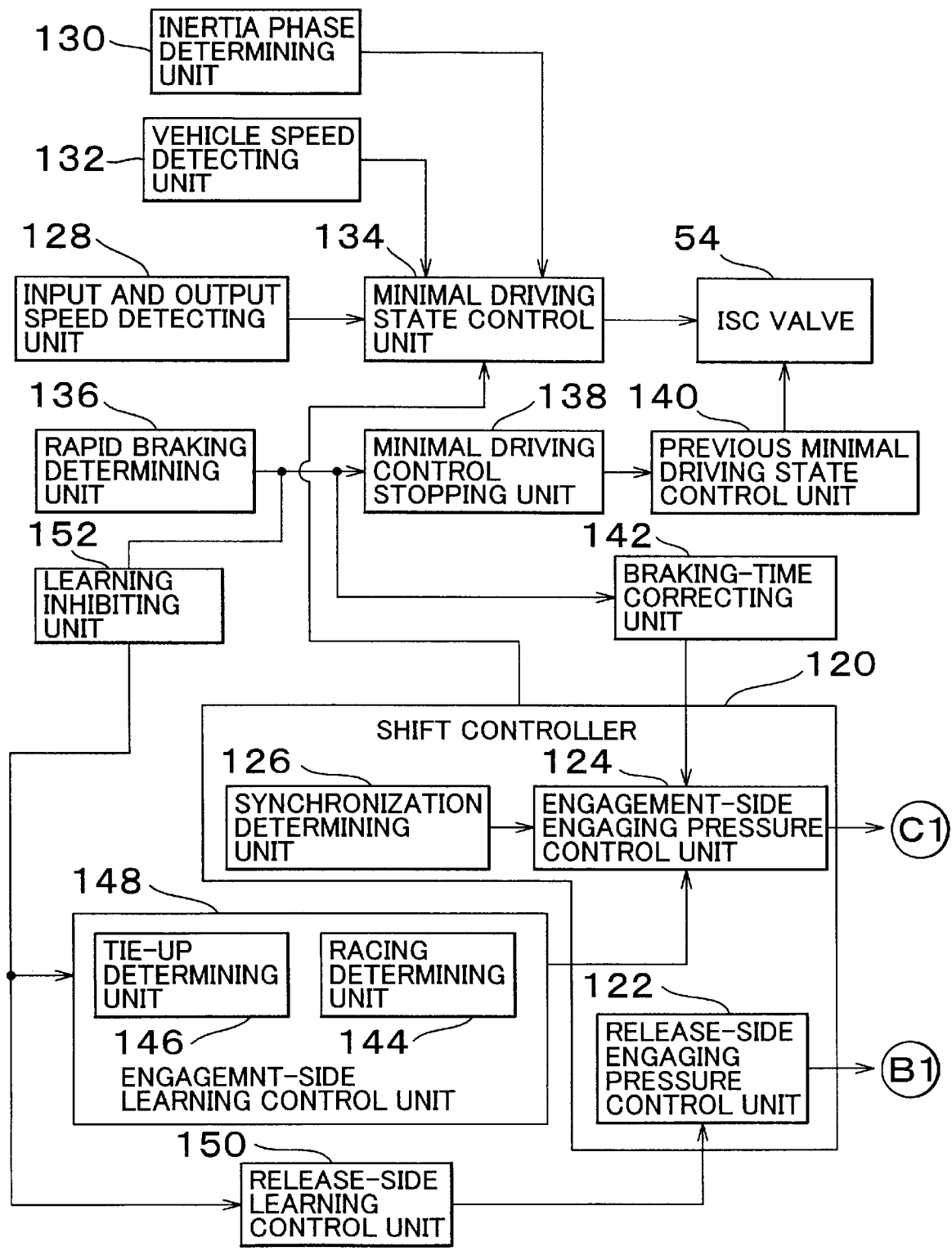
FIG. 15 is a function block diagram for explaining another example of control functions performed by the transmission control unit as shown in FIG. 3.

Next, a second embodiment of the invention will be described in detail with reference to FIG. 15 through FIG. 21. FIG. 15 is a function block diagram for explaining control functions of the shift control unit 78 according to the second embodiment of the invention. The shift control unit 78 of this embodiment further includes a braking-time correcting unit 142, an engagement-side learning control unit 148, a release-side learning control unit 150 and a learning inhibiting unit 152, in addition to the control functions of the shift control unit 78 according to the first embodiment.

Figure 16:
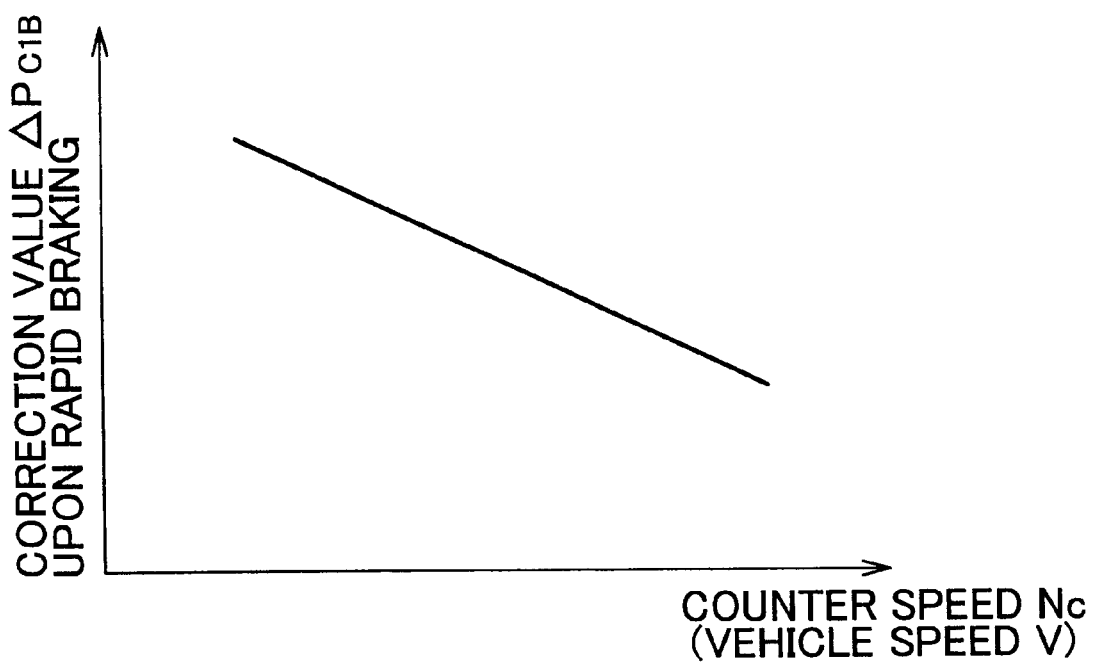
FIG. 16 is a graph showing a relationship used by a braking-time correcting unit of FIG. 15 for calculating a correction value at the time of braking of the vehicle.

The braking-time correcting unit 142 determines a correction value $\Delta P_{C1B}$ at the time of rapid braking, based on the actual counter speed $N_C$ (vehicle speed) or a vehicle decelerating state, such as a rate of change (decrease) of the counter speed $N_C$, from a stored relationship as shown in FIG. 16, for example. The correcting unit 142 then corrects the engaging pressure $P_{C1}$ for the clutch C1 in real time by adding the correction value $\Delta P_{C1B}$ to the engaging pressure $P_{C1}$ of the clutch C1 controlled by the engagement-side engaging pressure control unit 124. When a brake is applied, in particular, when a brake is suddenly applied, the difference $N_{SLIP}$ increases with a reduction in the counter speed $N_C$ in relation to the engine speed $N_E$, and the clutch C1 may not be caught or engaged with the engaging pressure $P_{C1}$, that is likely to decrease during coasting. For this reason, the correction value $\Delta P_{C1B}$ is added to the engaging pressure $P_{C1}$ of the clutch C1. The relationship of FIG. 16 is determined such that the correction value $\Delta P_{C1B}$ increases as the counter speed $N_C$ decreases and its rate of change increases, and is empirically determined in advance so that the clutch C1 can be easily caught or caught with high reliability even upon rapid braking.

The engagement-side learning control unit 148 includes a racing determining unit 144 and a tie-up determining unit 146. The racing determining unit 144 calculates an amount of racing $\Delta N_{TF}$ (r.p.m.), which is an amount of a temporary increase of the output shaft speed or turbine speed $N_T$ of the torque converter 12 that occurs during a period of 4→3 coast downshift, or an integral value (represented by an area) thereof, based on a difference between the actual turbine speed $N_T$ and the third-gear-ratio turbine speed $N_T$ to be achieved at the third gear ratio. The racing determining unit 144 then determines whether the racing amount $\Delta N_{TF}$ has exceeded a predetermined racing judgement value. The tie-up condition determining unit 146 determines a tie-up condition that occurs during the period of 4→3 coast downshift, based on the racing amount $\Delta N_{TF}$ and a change in the relative relationship between the input shaft speed and the output shaft speed of the torque converter 12. For example, the tie-up condition determining unit 146 determines whether the automatic transmission 14 is in a strong tie-up condition in which relatively strong shocks occur in the automatic transmission 14 that is placed in a temporarily locked state due to simultaneous release and engagement of the brake B1 and the clutch C1, or the transmission 14 is in a weak tie-up condition in which relatively small shocks occur. The tie-up condition determining unit 146 determines that a strong tie-up condition occurs during the 4→3 clutch-to-clutch coast downshift, when detecting a condition that the racing amount $\Delta N_{TF}$ as an amount of temporary increase in the turbine speed $N_T$ becomes substantially equal to zero, and a condition that the input shaft speed of the torque converter 12, or the engine speed $N_E$, exceeds the turbine speed $N_T$ after falling below the turbine speed $N_T$ from the state in which the engine speed $N_E$ is higher than the turbine speed $N_T$. The tie-up condition determining unit 146 determines that a weak tie-up condition occurs during the 4→3 clutch-to-clutch coast downshift, when detecting a condition that the racing amount $\Delta N_{TF}$ becomes substantially equal to zero, and a condition that the engine speed $N_E$ continues to be higher than or is kept higher than the turbine speed $N_T$.

The engagement-side learning control unit 148 includes the racing determining unit 144 and the tie-up determining unit 146, as described above. The engagement-side learning control unit 148 determines a learned correction value that would prevent a tie-up condition from occurring during the next 4→3 coast downshift, based on a racing condition determined by the racing determining unit 144 and a tie-up condition determined by the tie-up determining unit 146. The engagement-side learning control unit 148 then corrects the engagement pressure $P_{C1}$ for the clutch C1 controlled by the shift controller 120 during the next 4→3 coast downshift, based on the learned correction value. If a strong tie-up condition is determined, for example, the engaging pressure $P_{C1}$ for the clutch C1, for example, the initial engaging pressure (engagement-side stand-by pressure) $P_{C1I}$ is corrected, more specifically, is reduced by subtracting a preset correction value $\Delta P_{C1I1}$ from the stand-by pressure $P_{C1I}$ for the clutch C1. If a weak tie-up condition is determined, the engaging pressure $P_{C1}$ of the clutch, for example, the initial engaging pressure (engagement-side standby pressure) $P_{C1I}$ is corrected, more specifically, is reduced by subtracting a correction value $\Delta P_{C1I2}$ that is set smaller than the correction value $\Delta P_{C1I1}$, from the standby pressure $P_{C1I}$ for the clutch C1. If it is determined that the racing amount $\Delta N_{TF}$ exceeds the above-indicated racing judgement value, the engaging pressure $P_{C1}$ of the clutch C1 is corrected by adding a preset correction value $\Delta N_{C1I3}$ to the standby pressure $P_{C1I}$ of the clutch C1 so that the racing amount $\Delta N_{TF}$ becomes smaller than the racing judgement value, for example. With the learning correction as described above, the automatic transmission 14 is maintained in a favorable shift condition in which shift shock is minimized and slight racing occurs in the turbine speed $N_T$ during the 4→3 coast downshift.

The release-side learning control unit 150 corrects the engaging pressure $P_{B1}$ of the brake B1 by learning, so that a period $t_T$ up to a start of slipping of the brake B1 during a 4→3 coast downshift period becomes equal to a predetermined target period $t_{TM}$. The period $t_T$ up to the start of slipping of the brake B1 means a period $t_T$ from the time when an output signal for the 4→3 downshift is generated to the time when the turbine speed $N_T$ starts increasing, in other words, a period or duration of the torque phase of the 4→3 downshift. Namely, a correction value is determined based on a difference between the period $t_T$ up to the actual start of slipping of the brake B1 and the target period $t_{TM}$, from a predetermined relationship, so as to reduce the difference. The release-side learning control unit 150 then corrects the releasing pressure $P_{B1}$ for the brake B1 by adding or subtracting a correction value $\Delta P_{B1I1}$ to or from the standby pressure (initial pressure) $P_{B1I}$ of the brake B1 for the next 4→3 downshift.

The learning inhibiting unit 152 inhibits learning operations of the engagement-side learning control unit 148 and the release-side learning control unit 150 when the rapid braking determining unit 136 determines that the vehicle is being rapidly braked, to thereby prevent occurrence of shift shocks due to erroneous learning.

Figure 17:
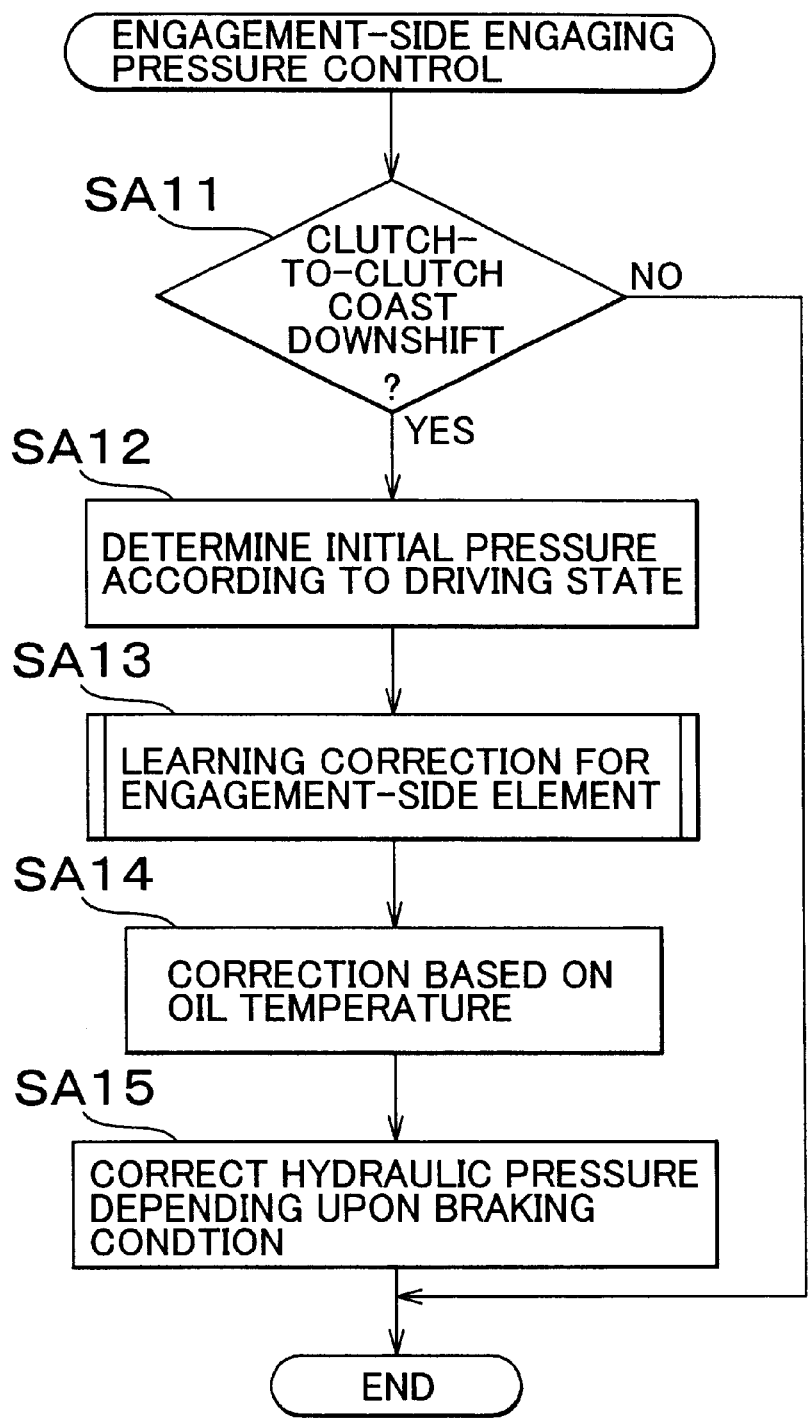
FIG. 17 is a flowchart showing an engagement-side engaging pressure control routine executed by the transmission control unit of FIG. 3.
Figure 18:
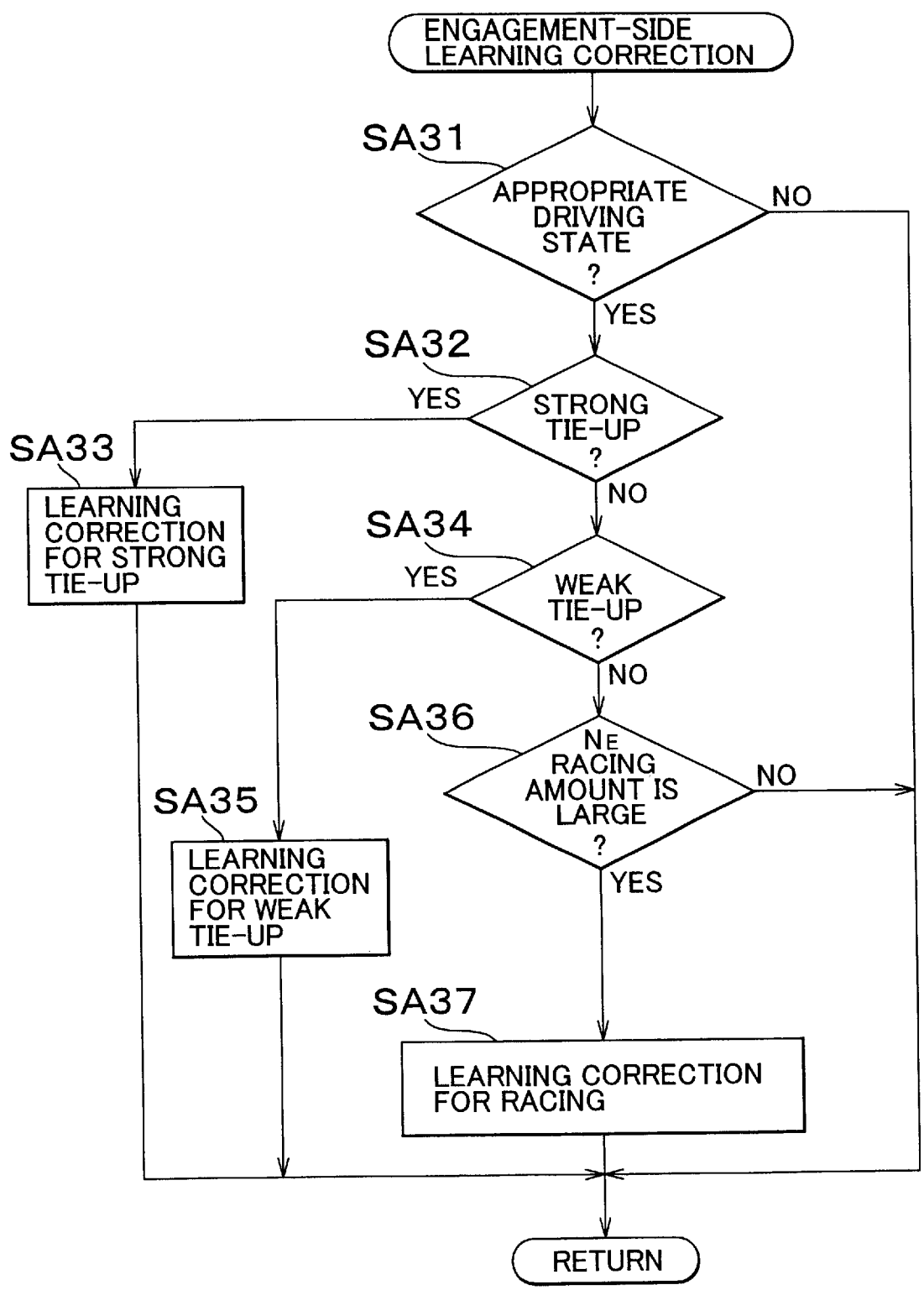
FIG. 18 is a flowchart showing an engagement-side learning correction routine executed by the transmission control unit of FIG. 3.
Figure 19:
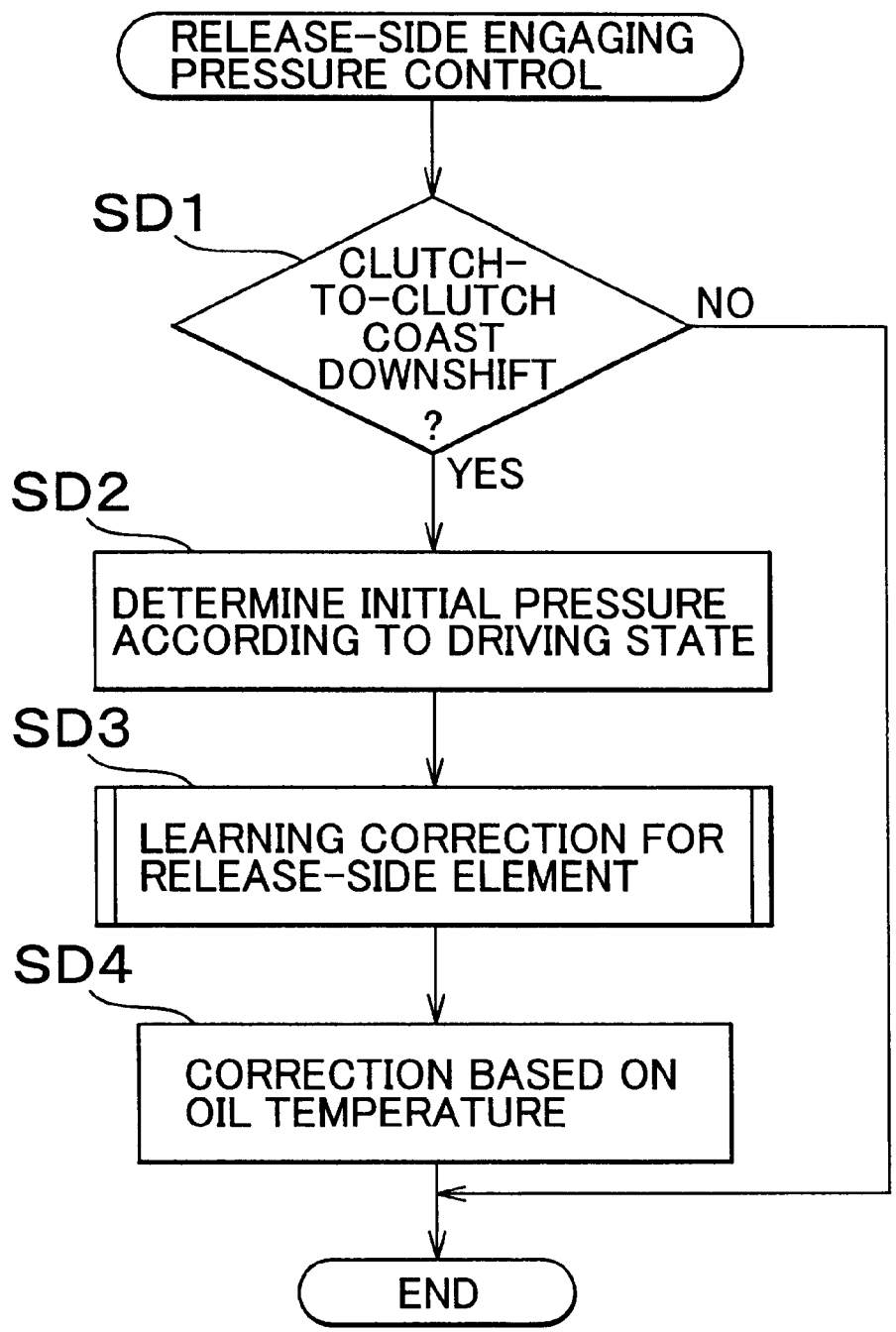
FIG. 19 is a flowchart showing a release-side engaging pressure control routine executed by the transmission control unit of FIG. 3.
Figure 20:
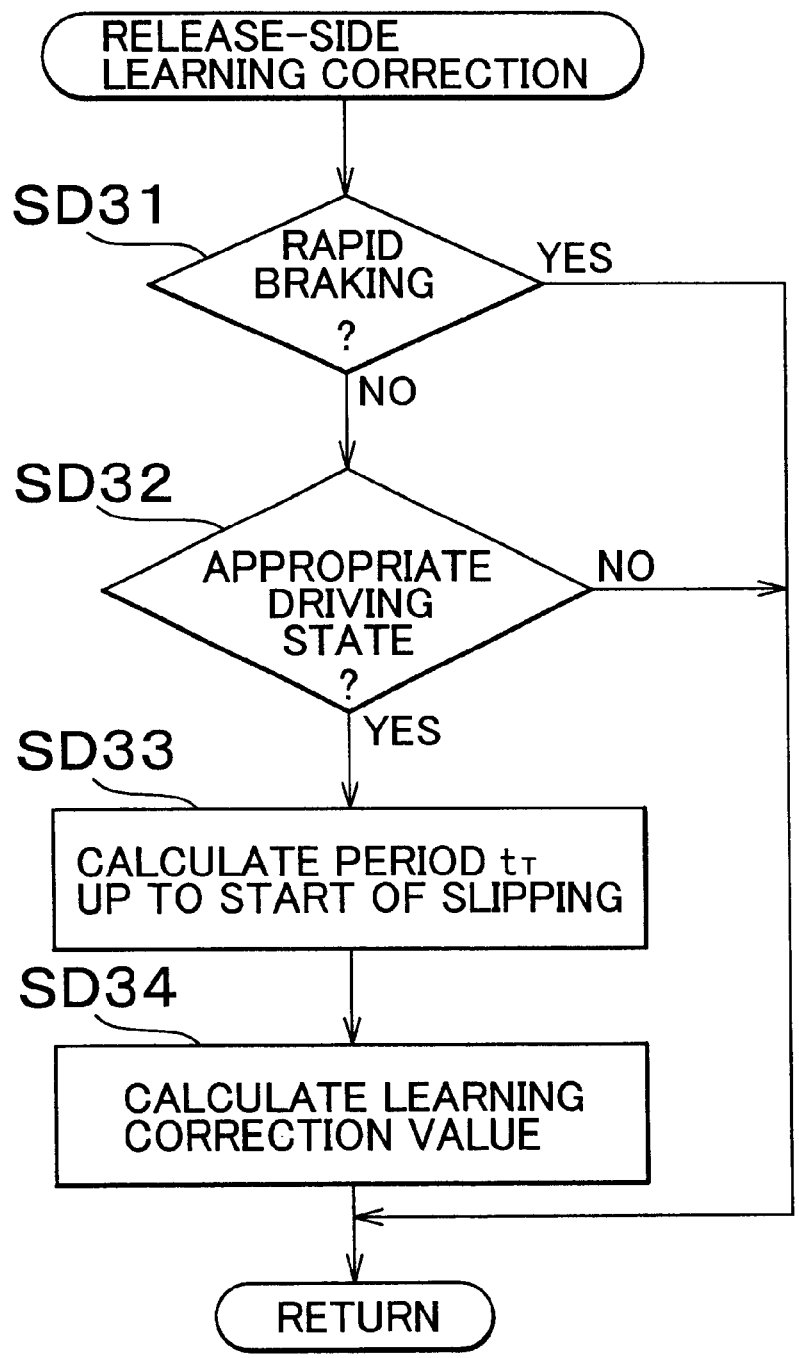
FIG. 20 is a flowchart showing a release-side learning correction routine executed by the transmission control unit of FIG. 3.
Figure 21:
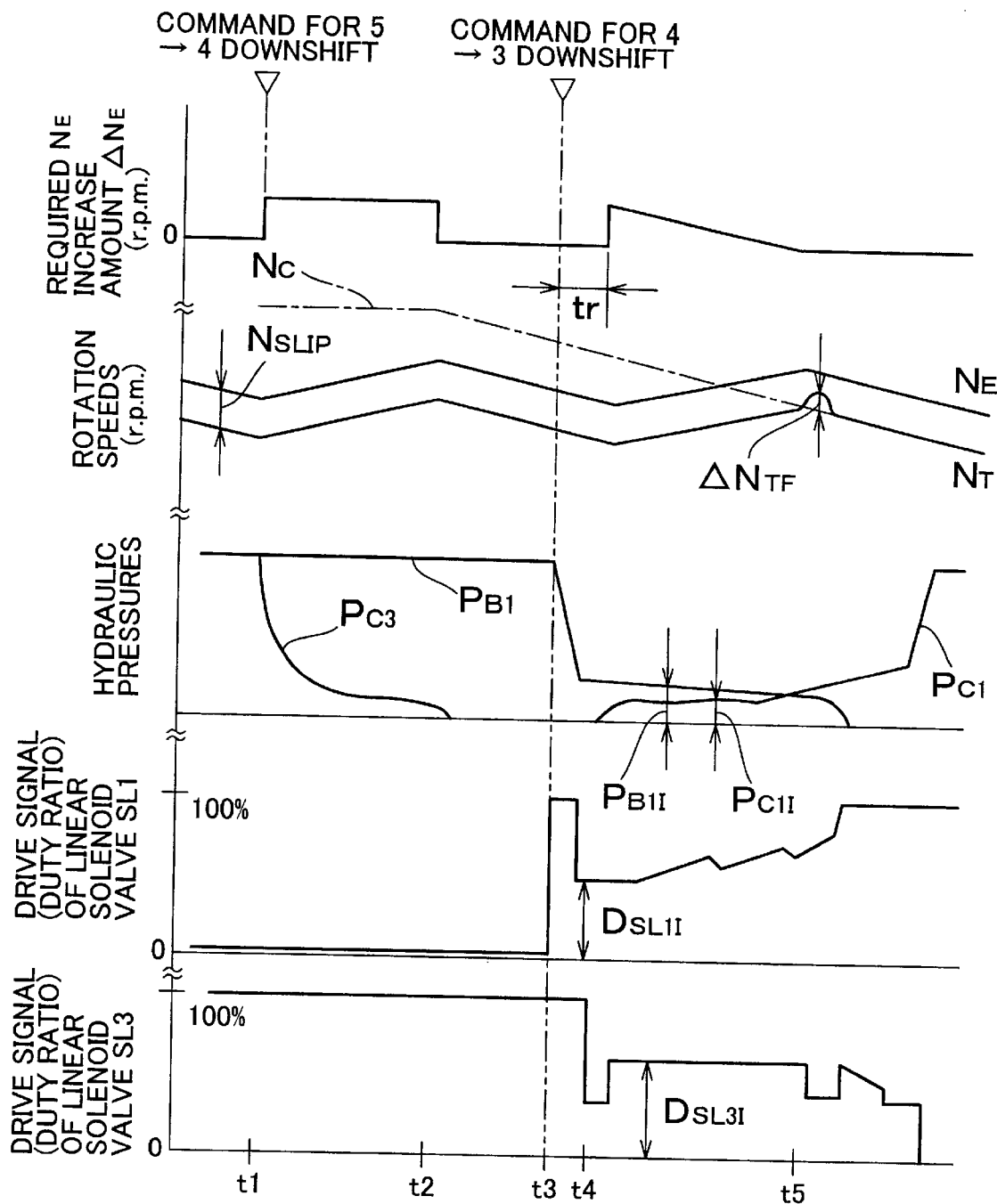
FIG. 21 is a time chart showing control operations performed by the transmission control unit of FIG. 3.

FIG. 17, FIG. 18 and FIG. 19 are flowcharts for explaining control operations of the transmission control unit 78. FIG. 17 illustrates an engagement-side hydraulic pressure control routine corresponding to the engagement-side engaging pressure control unit 124, and FIG. 18 illustrates an engagement-side engaging pressure learning correction routine of FIG. 17 corresponding to the engagement-side learning control unit 148. FIG. 19 illustrates a release-side hydraulic pressure control routine corresponding to the release-side hydraulic pressure control unit 122, and FIG. 20 illustrates a release-side engaging pressure learning correction routine of FIG. 19 corresponding to the release-side learning control unit 150.

In FIG. 17, step SA11 is executed to determine whether an output signal for a clutch-to-clutch downshift, e.g., a 4→3 downshift, is generated. If a negative decision (NO) is obtained in step SA11, the present routine is terminated. If an affirmative decision (YES) is obtained in step SA11, the initial engaging pressure $P_{C1I}$ for the clutch C1 is determined in step SA12 based on the input and output speed difference $N_{SLIP}$ (=$N_E-N_T$) of the torque converter 12 and the counter speed $N_C$, from the stored relationship as shown in FIG. 8, for example, and the initial engaging pressure $P_{C1I}$ thus determined is maintained. Subsequently, the engagement-side learning correction routine of step SA13 corresponding to the engagement-side learning control unit 148 is executed. The engagement-side learning correction routine is illustrated in FIG. 18.

In FIG. 18, step SA31 is executed to determine whether the vehicle is in an appropriate driving state for learning correction, by determining, for example, whether the vehicle is in a minimal driving state, based on the input and output speed difference $N_{SLIP}$ of the torque converter 12 which reflects the driving state of the vehicle. If a negative decision (NO) is obtained in step SA31, this routine is terminated. If an affirmative decision (YES) is obtained in step SA31, step SA32 is executed to determine whether the automatic transmission 14 is in a strong tie-up condition. If a negative decision (NO) is obtained in step SA32, step SA34 is executed to determine whether the transmission 14 is in a weak tie-up condition. If a negative decision (NO) is obtained in step SA34, step SA36 corresponding to the racing determining unit 144 is executed.

If an affirmative decision (YES) is obtained in step SA32, namely, if it is determined that the transmission 14 is in a strong tie-up condition, step SA33 is executed to correct the engaging pressure $P_{C1}$, for the clutch C1, e.g., the initial engaging pressure (engagement-side standby pressure ) $P_{C1I}$, by subtracting the preset correction value $\Delta P_{C1I1}$ from the standby pressure $P_{C1I}$ of the clutch C1 to thereby reduce the standby pressure $P_{C1I}$. If an affirmative decision (YES) is obtained in step SA34, namely, if it is determined that the transmission 14 is in a weak tie-up condition, step SA35 is executed to correct the engaging pressure $P_{C1}$ for the clutch C1, e.g., the initial engaging pressure (engagement-side standby pressure ) $P_{C1I}$, by subtracting the preset correction value $\Delta P_{C1I2}$ that is set to be smaller than the above correction value $\Delta P_{C1I1}$, from the standby pressure $P_{C1I}$ of the clutch C1, to thereby reduce the standby pressure $P_{C1I}$. If an affirmative decision (YES) is obtained in step SA36, namely, if it is determined that the racing amount $\Delta N_{TF}$ is larger than the predetermined judgement value, step SA37 is executed to correct the engaging pressure $P_{C1}$ of the clutch C1 by adding the preset correction value $\Delta P_{C1/3}$ to the standby pressure $P_{C1I}$ for the clutch C1 so that the resulting racing amount $\Delta N_{TF}$ becomes smaller than the racing judgement value.

Referring back to FIG. 17, step SA14 following step SA13 is executed to correct, for example, the timing of change of the engaging pressure $P_{C1}$ for the clutch C1, based on the actual working oil temperature $T_{OIL}$, so as to reduce an influence of reduced viscosity of the working oil. In step SA15 corresponding to the braking-time correcting unit 142, the engaging pressure $P_{C1}$ for the clutch C1 is corrected in real time depending upon a braking condition of the vehicle. More specifically, the braking-time correction value $\Delta P_{C1B}$ is determined based on the actual counter speed $N_C$ or the rate of change of the counter speed $N_C$, for example, according to the stored relationship as shown in FIG. 16, and the engaging pressure $P_{C1}$ of the clutch C1 is corrected in real time by adding the braking-time correction value $\Delta P_{C1B}$ to the engaging pressure $P_{C1}$ for the clutch C1.

In FIG. 19, step SD1 is executed to determine whether an output signal for a clutch-to-clutch downshift, e.g., a 4→3 downshift, is generated. If a negative decision (NO) is obtained in step SD1, this routine is terminated. If an affirmative decision (YES) is obtained in step SD1, step SD2 is executed to determine an initial release pressure $P_{B1I}$ for the brake B1 based on the input and output speed difference $N_{SLIP}$ ($=N_E-N_T$) of the torque converter 12 and the counter speed $N_C$, for example, according to the stored relationship as shown in FIG. 8, and hold the brake B1 at the initial release pressure $P_{B1I}$. Subsequently, the release-side learning correction routine corresponding to the release-side learning control unit 158 is executed. The release-side learning correction routine is illustrated in FIG. 20.

In FIG. 20, step SD31 is executed to determine whether the vehicle is not being rapidly braked, which is a precondition of learning correction, based on, for example, the braking pressure, the deceleration of the vehicle, or the rate of decrease of the counter speed $N_C$. If a negative decision (NO) is obtained in step SD31, namely, if the vehicle is rapidly braked, the present routine is terminated. If a positive decision (YES) is obtained in step SD31, step SD32 is executed to determine whether the vehicle is in an appropriate driving state suitable for learning correction, for example, by determining whether the vehicle is in a minimal driving state, based on the input and output speed difference $N_{SLIP}$ of the torque converter 12 that reflects the driving state of the vehicle. If a negative decision (NO) is obtained in step SD32, the present routine is terminated. If an affirmative decision (YES) is obtained in step SD32, step SD33 is executed to calculate the period $t_T$ up to the start of actual slipping of the brake B1 during the 4→3 downshift. Step SD33 is followed by step SD34 in which a correction value is determined based on a difference between the period $t_T$ up to the start of actual slipping and the target period $t_{TM}$, according to a predetermined relationship, so as to reduce the difference. Then, the standby pressure (initial pressure) $P_{B1I}$ of the brake B1 during the next 4→3 downshift is corrected by adding or subtracting the determined correction value $\Delta P_{B1I1}$ to or from the standby pressure $P_{B1I}$.

Referring back to FIG. 19, step SD4 following step SD3 is executed to correct the timing of change of the engaging pressure $P_{C1}$ for the clutch C1 based on the actual working oil temperature $T_{OIL}$, so as to reduce an influence of reduced viscosity of the working oil.

According to the second embodiment of the invention as described above, the shift controller 120 serves to set oil pressures applied to the hydraulically operated friction elements associated with a coast downshift during a shift period, depending upon the minimal driving state of the vehicle, so that the engaging pressures for the friction elements are suitably controlled within the shift period. For example, the initial pressure $P_{B1I}$ of the engaging pressure $P_{B1}$ for the brake B1 associated with a 4→3 clutch-to-clutch downshift and the initial pressure $P_{C1I}$ of the engaging pressure $P_{C1}$ for the clutch C1 associated with the 4→3 downshift are appropriately set during the 4→3 downshift period. Thus, the engaging or releasing operations can be performed with high accuracy, irrespective of disturbances, such as braking of the vehicle, resulting in significant reduction in shift shocks.

According to the second embodiment, the input and output speed difference $N_{SLIP}$ of the torque converter (fluid coupling device) 12 provided between the automatic transmission 14 and the engine 10 is detected as a parameter representing an engine brake condition or a vehicle driving or running state. On the basis of the input and output speed difference $N_{SLIP}$ corresponding to the minimal driving state of the vehicle, the shift controller 120 is able to appropriately set the initial pressure $P_{B1I}$ of the engaging pressure $P_{B1}$ for the brake B1 associated with the 4→3 clutch-to-clutch downshift and the initial pressure $P_{C1I}$ of the engaging pressure $P_{C1}$ for the clutch C1 also associated with the 4→3 downshift, during the 4→3 downshift period. Accordingly, the engaging/releasing operations for the clutch-to-clutch coast downshift can be carried out with improved accuracy, resulting in significant reduction in shift shocks.

According to the second embodiment, the braking-time correcting unit 142 is further provided for correcting in real time the engaging pressure $P_{C1}$ for the clutch C1 as an engagement-side friction element to be increased in accordance with the engine brake condition during braking. With the braking-time correcting unit 142 thus provided, the engaging pressure $P_{C1}$ for the clutch C1 can be corrected, i.e., increased, in real time during braking, so that the clutch engaging action is favorably carried out in the clutch-to-clutch coast downshift, irrespective of torque variation at the time of rapid braking of the vehicle, whereby shift shocks, or the like, can be sufficiently reduced or suppressed.

According to the second embodiment, the learning control means (including the engagement-side learning control unit 148 and release-side learning control unit 150) serves to correct the hydraulic pressures controlled by the shift controller 120 through learning. Providing the learning control means reduces or eliminates differences among individual apparatus or chronological changes, thus assuring improved accuracy in the engaging/releasing actions and significantly reduced shift shocks.

According to the second embodiment, the engagement-side learning control unit 148 determines the degree of tie-up conditions in 4→3 clutch-to-clutch downshifts, based on an amount of racing (or a rapid increase) in the output shaft speed of the fluid coupling device, and corrects, by learning, the engaging pressure $P_{C1}$ for the clutch C1 as an engagement-side friction element, depending upon the degree of the tie-up condition. Although the 4→3 clutch-to-clutch downshift generally requires relatively subtle hydraulic control, the operation to engage the clutch C1 according to this embodiment is carried out with sufficiently high accuracy, and shift shocks, or the like, can be sufficiently suppressed.

According to the second embodiment, the engagement-side learning control unit 148 determines that a strong tie-up condition occurs in the 4→3 clutch-to-clutch downshift when the racing amount $\Delta N_{TF}$ of the turbine speed $N_T$ becomes substantially equal to zero, and the engine speed $N_E$ exceeds the turbine speed $N_T$ again after it falls below the turbine speed $N_T$ from the state in which the engine speed $N_E$ is larger than the turbine speed $N_T$. The engagement-side learning control unit 148 also determines that a weak tie-up condition occurs in the 4→3 clutch-to-clutch downshift when the racing amount $\Delta N_{TF}$ of the turbine speed $N_T$ becomes substantially equal to zero, and the engine speed $N_E$ is kept larger than the turbine speed $N_T$. Thus, two-level tie-up conditions can be determined, thus permitting subtle learning correction. This arrangement further ensures high accuracy in the engaging action of the clutch C1 during the 4→3 clutch-to-clutch downshift, and shift shocks, or the like, can be sufficiently reduced.

According to the second embodiment, the release-side learning control unit 150 corrects the engaging pressure $P_{B1}$ for the brake B1 by learning so that the period $t_T$ up to the start of slipping of the brake as a release-side friction element during the 4→3 clutch-to-clutch downshift becomes equal to the target period $t_{TM}$. With the release-side learning control unit 150, the releasing action of the brake B1 is controlled with high accuracy, and shift shocks, which would otherwise occur in the 4→3 clutch-to-clutch downshift, can be sufficiently reduced.

According to the second embodiment, the rapid braking determining unit 136 serves to determine the rapid braking of the vehicle, and the learning inhibiting unit 152 serves to inhibit learning by the learning control means (including the engagement-side learning control unit 148 and release-side learning control unit 150) when the rapid braking determining unit 136 determines that the vehicle is being rapidly braked. Since the learning by the learning control units 148, 159 is inhibited by the learning inhibiting unit 152 upon rapid braking, erroneous learning is avoided, and shift shocks, which would otherwise occur due to erroneous learning, can be sufficiently reduced or suppressed.

It is to be understood that the invention may be otherwise embodied with various changes, modifications or improvements.

While the hydraulic control performed by the shift controller 120 is concerned with 4→3 clutch-to-clutch downshifts in the illustrated embodiment, the invention may also be equally applied to hydraulic control for 3→2 downshifts. In addition, while learning control of an engagement-side oil pressure and a release-side oil pressure performed by the engagement-side learning control unit 148 and the release-side learning control unit 150 is concerned with 4→3 clutch-to-clutch downshifts, the learning control of the engagement-side and release-side oil pressures may be performed with respect to 3→2 downshifts.

In the illustrated embodiment, the minimal driving state controller 134 uses the ISC valve 54 for increasing the engine speed $N_E$ by the predetermined amount. However, the minimal driving state control unit may use other engine speed control devices, such as the throttle actuator 50 for driving the throttle valve 52, the fuel injection valve(s) for adjusting the quantity of fuel injected into the engine 10, or an ignition timing control device for controlling the ignition timing of the engine 10.

While the input and output rotation speed detecting unit 128 of the illustrated embodiment detects the difference $N_{SLIP}$ of the input and output shafts speeds of the torque converter 12, the detecting unit 128 may detect the ratio of the input and output shaft speeds. In this case, the input and output speed difference $N_{SLIP}$ as described above is replaced by the input and output speed ratio.

While the minimal driving state control unit 134 of the illustrated embodiment reduces the engine speed increase amount $\Delta N_E$ in accordance with the rate of decrease of the counter speed $N_C$ corresponding to the vehicle speed V, another parameter, such as a wheel speed, may be used in place of the counter speed $N_C$.

While the start of the inertia phase is determined by detecting the time when the turbine speed $N_T$ starts increasing, the start of the inertia phase may also be determined by detecting that the elapsed time $t_{EL}$ since an output signal for a 4→3 downshift was generated exceeds a predetermined time $T_T$.

While the input and output speed difference $N_{SLIP}$ of the torque converter 12 is used in the illustrated embodiment, a fluid coupling may be used in place of the torque converter 12.

While the minimal driving state control unit 134 of the illustrated embodiment starts minimal driving control from the initiation of the inertia phase of the 4→3 downshift, the minimal driving control need not be started from the start of the inertia phase, but may be started from any point of time after an output signal for the 4→3 downshift is generated.

The automatic transmission 14 used in the illustrated embodiment may be of any other type. For example, while the automatic transmission 14 is constructed for use in a front-engine front-drive vehicle so as to provide five forward gear ratios in the illustrated embodiment, the transmission may be constructed so as to provide four or less forward gear ratios or six or more forward gear ratios, or may be constructed for use in a front-engine rear-drive vehicle.

While the 4→3 downshifts of the automatic transmission 14 have been explained in the illustrated embodiment, the invention is also equally applicable to the cases of 3→2 downshifts and other downshifts.

It is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A shift control apparatus of an automatic transmission of a motor vehicle to which a torque is transmitted from an engine via a fluid coupling device, the automatic transmission including a plurality of hydraulically operated friction elements, wherein a clutch-to-clutch downshift is carried out during coasting of the vehicle by releasing one of the friction elements as a release-side friction element and engaging another of the friction elements as an engagement-side friction element, comprising:

a speed difference detecting unit that detects a difference between input and output rotation speeds of the fluid coupling device; and a minimal driving state controller that increases an engine speed by a controlled amount based on the difference between the input and output rotation speeds detected by the speed difference detecting unit when the clutch-to-clutch downshift is carried out during coasting of the vehicle, so that the vehicle is brought into a minimal driving state in which the engine speed is slightly higher than the output rotation speed of the fluid coupling device.

2. The shift control apparatus according to claim 1, wherein the minimal driving state controller determines an amount of increase of the engine speed for establishing the minimal driving state of the vehicle, such that the amount of increase of the engine speed decreases with an increase in an average value of the difference between the input and output rotation speeds of the fluid coupling device within a predetermined period.

3. The shift control apparatus according to claim 1, wherein the minimal driving state controller determines an amount of increase of the engine speed for establishing the minimal driving state of the vehicle such that the amount of increase of the engine speed is reduced as a vehicle speed decreases.

4. The shift control apparatus according to claim 3, wherein the amount of increase of the engine speed is reduced in real time at a rate that is determined based on a rate of decrease of the vehicle speed.

5. The shift control apparatus according to claim 1, further comprising:
a synchronization determining unit that determines whether synchronization of rotation of the engagement-side friction element associated with the clutch-to-clutch downshift is accomplished; and
an engaging pressure controller that quickly increases an engaging pressure for the engagement-side friction element from an initial pressure that has been established, when the synchronization determining unit determines the synchronization of rotation of the engagement-side friction element.

6. The shift control apparatus according to claim 5, wherein the initial pressure of the engaging pressure for the engagement-side friction element is determined based on the difference between input and output rotation speeds of the fluid coupling device and a vehicle speed.

7. The shift control apparatus according to claim 1, further comprising:
a rapid braking determining unit that determines whether the vehicle is being rapidly braked; and
a minimal driving state stopping unit that immediately stops a control of increasing the engine speed for establishing the minimal driving state of the vehicle, the control having been performed since a command signal for a previous coast downshift was generated, when the rapid braking determining unit determines that the vehicle is being rapidly braked.

8. The shift control apparatus according to claim 1, wherein the minimal driving state controller starts increasing the engine speed by the controlled amount for establishing the minimal driving state, at around the time of a start of an inertia phase of the clutch-to-clutch downshift effected during coasting of the vehicle.

9. The shift control apparatus according to claim 8, wherein the start of the inertia phase of the clutch-to-clutch downshift is determined by detecting a point of time when the output rotation speed of the fluid coupling device starts increasing.

10. A method for controlling shifting of an automatic transmission of a motor vehicle to which a torque is transmitted from an engine via a fluid coupling device, the automatic transmission including a plurality of hydraulically operated friction elements, wherein a clutch-to-clutch downshift is carried out during coasting of the vehicle by releasing one of the friction elements as a release-side friction element and engaging another of the friction elements as an engagement-side friction element, the method comprising the steps of:
detecting a difference between input and output rotation speeds of the fluid coupling device; and
increasing an engine speed by a controlled amount based on the difference between the input and output rotation speeds when the clutch-to-clutch downshift is carried out during coasting of the vehicle, so that the vehicle is brought into a minimal driving state in which the engine speed is slightly higher than the output rotation speed of the fluid coupling device.

11. The method according to claim 10, wherein an amount of increase of the engine speed for establishing the minimal driving state of the vehicle is determined such that the amount of increase of the engine speed is reduced as a vehicle speed decreases.

12. The method according to claim 10, further comprising the steps of:
determining whether synchronization of rotation of the engagement-side friction element associated with the clutch-to-clutch downshift is accomplished; and
quickly increasing an engaging pressure for the engagement-side friction element from an initial pressure that has been established, when the synchronization of rotation of the engagement-side friction element is determined.

13. The method according to claim 10, further comprising the steps of:
determining whether the vehicle is being rapidly braked; and
immediately stopping a control of increasing the engine speed for establishing the minimal driving state of the vehicle, the control having been performed since a command signal for a previous coast downshift was generated.

14. The method according to claim 10, wherein the step of increasing the engine speed by the controlled amount for establishing the minimal driving state is started at around the time of a start of an inertia phase of the clutch-to-clutch downshift effected during coasting of the vehicle.

* * * * *